US007337108B2

(12) United States Patent
Florencio et al.

(10) Patent No.: US 7,337,108 B2
(45) Date of Patent: Feb. 26, 2008

(54) SYSTEM AND METHOD FOR PROVIDING HIGH-QUALITY STRETCHING AND COMPRESSION OF A DIGITAL AUDIO SIGNAL

(75) Inventors: Dinei Florencio, Redmond, WA (US); Philip Chou, Bellevue, WA (US); Li-Wei He, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 10/660,325

(22) Filed: Sep. 10, 2003

(65) Prior Publication Data

US 2005/0055204 A1 Mar. 10, 2005

(51) Int. Cl.
*G10L 11/06* (2006.01)
*G10L 21/04* (2006.01)
*H04B 1/66* (2006.01)

(52) U.S. Cl. ...................... 704/208; 704/214; 704/500; 704/503

(58) Field of Classification Search ................ 704/207, 704/208, 214, 216, 218, 503, 504, 500, 501
See application file for complete search history.

(56) References Cited

U.S. PATENT DOCUMENTS 4,435,831 A * 3/1984 Mozer ........................ 704/267
5,689,440 A * 11/1997 Leitch et al. ............... 370/313
5,717,823 A * 2/1998 Kleijn ........................ 704/220
5,890,108 A * 3/1999 Yeldener ..................... 704/208
5,893,062 A * 4/1999 Bhadkamkar et al. ...... 704/270
5,960,388 A * 9/1999 Nishiguchi et al. ......... 704/208
6,138,089 A * 10/2000 Guberman .................. 704/207
6,477,502 B1 * 11/2002 Ananthpadmanabhan et al. .......................... 704/503
6,718,309 B1 * 4/2004 Selly .......................... 704/503
6,754,265 B1 * 6/2004 Lindemann ................. 375/240
6,985,857 B2 * 1/2006 Adut .......................... 704/230
2003/0033140 A1 2/2003 Taori et al. ................. 704/214

(Continued)

OTHER PUBLICATIONS

Sungjoo Lee, et al., "Variable Time-Scale Modification of Speech using Transient Information" Acoustics, Speech, and Signal Processing, 1997. ICASSP-97., 1997 IEEE International Conference on Munich, Germany Apr. 21-24, 1997, Los Alamitos, CA, USA,IEEE Comput. Soc, vol. 2, pp. 1319-1322.

(Continued)

*Primary Examiner*—Martin Lerner
(74) *Attorney, Agent, or Firm*—Lyon & Harr, LLP; Mark A. Watson

(57) ABSTRACT

An adaptive "temporal audio scaler" is provided for automatically stretching and compressing frames of audio signals received across a packet-based network. Prior to stretching or compressing segments of a current frame, the temporal audio scaler first computes a pitch period for each frame for sizing signal templates used for matching operations in stretching and compressing segments. Further, the temporal audio scaler also determines the type or types of segments comprising each frame. These segment types include "voiced" segments, "unvoiced" segments, and "mixed" segments which include both voiced and unvoiced portions. The stretching or compression methods applied to segments of each frame are then dependent upon the type of segments comprising each frame. Further, the amount of stretching and compression applied to particular segments is automatically variable for minimizing signal artifacts while still ensuring that an overall target stretching or compression ratio is maintained for each frame.

32 Claims, 7 Drawing Sheets

U.S. PATENT DOCUMENTS

| | | | | |
|---|---|---|---|---|
| 2005/0055201 | A1* | 3/2005 | Florencio et al. | 704/214 |
| 2005/0058145 | A1* | 3/2005 | Florencio et al. | 370/412 |
| 2006/0209955 | A1* | 9/2006 | Florencio et al. | 375/240.12 |
| 2006/0277052 | A1* | 12/2006 | He et al. | 704/503 |

OTHER PUBLICATIONS

Veldhuis R. et al., "Time-scale and pitch modifications of speech signals and resynthesis from the discrete short-time Fourier transform" Speech Communication, Elsevier Science Publishers, Amsterdam, NL, Jul. 24, 1997, vol. 18, Nr. 3, pp. 257-279.

Liang Y J; Faerber N; Girod B, "Adaptive playout scheduling using time-scale modification in packet voice communications," 2001 IEEE International Conference on Acoustics, Speech, and Signal Processing. Proceedings. (ICASSP). Salt Lake City, UT, May 7-11, 2001, IEEE International Conference on Acoustics, Speech, and Signal Processing (ICASSP), New York, NY : IEEE, US, 2001, vol. 3 of 6, pp. 1445-1448.

Macon M W; Clements M A, "Sinusoidal Modeling and Modification of Unvoiced Speech," IEEE Transactions on Speech and Audio Processing, IEEE Inc. New York, US, Nov. 1997, vol. 5, Nr. 6, pp. 557-560.

Malah D, "Time-Domain Algorithms for Harmonic Bandwidth Reduction and Time Scaling of Speech Signals," IEEE Transactions on Acoustics, Speech and Signal Processing, IEEE Inc. New York, US, Apr. 1979, vol. ASSP-27, Nr. 2, pp. 121-133.

Moulines E; Laroche J., "Non-parametric Techniques for Pitch-Scale Modification of Speech," Speech Communication, Elsevier Science Publishers, Amsterdam, NL, Feb. 1995, vol. 16, Nr. 2, pp. 175-205.

Ejaz Mahfuz, "Packet Loss Concealment of Voice Transmission over IP Networks," Master Thesis, Department of Electrical Engineering, McGill University, Montreal, Canada, Sep. 27, 2001.

Wen-Tsai Liao; Jeng-Chun Chen; Ming-Syan Chen, "Adaptive Recovery Techniques for Real-Time Audio Streams," Proceedings IEEE Infocom 2001. The Conference on Computer Communications. 20th. Annual Joint Conference of the IEEE Computer andCommunications Societies. Anchorage, AK, Apr. 22-26, 2001, Proceedings IEEE Infocom. The Conference on Computer Communications, New York, NY : IEEE, US, vol. 1 of 3. Conf. 20, pp. 815-823.

R. Ramjee, J. Kurose and D. Towsley, 'Adaptive playout mechanisms for packetized audio applications in wide-area networks,' Proc. of INFOCOM'94, vol. 2, pp. 680-688, Jun. 1994.

Y. Liang, N. Farber, and B.Girod, "Adaptive playout scheduling and loss concealment for voice communication over IP networks," *IEEE Transactions on Multimedia*, Apr. 2001.

* cited by examiner

SYSTEM AND METHOD FOR PROVIDING HIGH-QUALITY STRETCHING AND COMPRESSION OF A DIGITAL AUDIO SIGNAL

BACKGROUND

1. Technical Field

The invention is related to automatic time-scale modification of audio signals, and in particular, to a system and method for providing automatic high quality stretching and compression of segments of an audio signal containing speech or other audio.

2. Related Art

Lengthening or shortening of audio segments such as frames in a speech-based audio signal is typically referred to as speech stretching and speech compression, respectively. In many applications it is necessary to either stretch or compress particular segments of speech, or silence, within the signal in order to enhance the perceptual quality of the speech in a signal, or to reduce delay. For example, stretching is often used to enhance the intelligibility of the speech, to replace lost or noisy frames in the speech signal, or to provide additional time when waiting for delayed speech data, as it may be used in some adaptive de-jittering algorithms. Similarly, shortening or compression of speech is used for a number of purposes, including speeding up a recorded signal to reduce listening time, reducing transmission bitrate of a signal, speeding up segments of the signal to reduce overall transmission time, and reducing transmission delay so that the signal can be transmitted closer to real-time following some type of processing of the signal frames.

For example, conventional packet communication systems, such as the Internet or other broadcast network, are typically lossy. In other words, not every transmitted packet can be guaranteed to be delivered either error free, on time, or even in the correct sequence. If the receiver can wait for packets to be retransmitted, correctly ordered, or corrected using some type of error correction scheme, then the fact that such networks are inherently lossy is not an issue. However, for near real-time applications, such as, for example, voice-based communications systems across such packet-based networks, the receiver can not wait for packets to be retransmitted, correctly ordered, or corrected without causing undue, and noticeable, lag or delay in the communication.

Some conventional schemes address the problems of voice communications across a packet-based network by simply causing the receiver to substitute silence for missing or corrupted packets. Related schemes simply play back received frames as they are received, regardless of the often variable delay between packet receipt times. Unfortunately, while such methods are very simple to implement, the effect is typically a signal having easily perceived artifacts resulting in a perceptually lower signal quality.

A more elaborate scheme attempts to provide a better perceptual signal quality by replacing missing speech packets with wave-form segments from previously correctly received packets in order to increase a maximum tolerable missing packet rate. This scheme is based on a probabilistic prediction of waveform substitution failure as a function of packet duration and packet loss rate to select substitute waveforms for replacing missing packets. Further, this scheme also uses either signal pattern matching or explicit estimates of voicing and pitch for selecting the substitute waveforms. In addition, following waveform substitution, a further reduction in perceived distortion is achieved by smoothing the boundaries between discontinuities at the packet boundaries where substitute waveforms were used to replace lost or corrupted packets. Unfortunately, while this scheme represents a significant improvement over simply replacing missing frames with silence, there are still easily perceived audio artifacts in the reconstructed signal.

Another conventional scheme attempts to address the issue of perceived audio artifacts, and thus of perceived signal quality, by providing a packet-based replacement of lost or corrupted frames by variable temporal scaling of individual voice packets (via stretching or compression) in response to packet receipt delay or loss. In particular, this scheme uses a version of a conventional method referred to as "waveform similarity overlap-add" (WSOLA) to accomplish temporal scaling of one or more packets while minimizing perceptual artifacts in the scaled packets.

The basic idea of the WSOLA and related methods involves decomposing input packets input into overlapping segments of equal length. These overlapping segments are then realigned and superimposed via a conventional correlation process along with smoothing of the overlap regions to form an output segment having a degree of overlap which results in the desired output length. The result is that the composite segment is useful for hiding or concealing perceived packet delay or loss. Unfortunately, while this scheme provides a significant improvement to previous speech stretching and compression methods, it still leaves substantial room for improvement in perceived quality of stretched and compressed audio signals.

Therefore, what is needed is a system and method that provides high quality time scale modification of audio signals containing speech and other audio. In particular, such a system and method should provide for speech stretching and compression while minimizing perceivable artifacts in the reconstructed signal. In addition, such a system and method should also provide for variable compression and stretching to account for variable network packet delay and loss.

SUMMARY

Time-scale modification of audio signals containing speech has been used for a number of years for improving intelligibility, reducing listening time, or enhancing the quality of signals transmitted across lossy and delay prone packet-based networks such as the Internet and then reconstructed on a client computer or receiver. For example, in many applications it is desirable to stretch or compress one or more frames of an audio signal containing speech. Typically, stretching is used for enhancing intelligibility of a fast talker, extending the duration of a segment of speech in the signal in order to replace lost, overly delayed, or noisy frames, or in de-jittering algorithms to provide additional time when waiting for delayed speech packets. Similarly, shortening or compression of the audio signal is typically used for reducing listening time, for reducing transmission bitrate of a signal, for speeding up frames of the signal to reduce overall transmission time, and for reducing transmission delay so that the signal can be transmitted closer to real-time following some type of processing of the signal frames. In view of these uses, there is a clear need for a system and method for stretching and compression of speech that provides a high quality output while minimizing any perceivable artifacts in a reconstructed signal.

To address this need for high quality audio stretching and compression, an adaptive "temporal audio scaler" is provided for automatically stretching and compressing frames (or segments) of audio signals. The temporal audio scaler described herein provides a system and method for temporal scaling, including both stretching and compression, of audio signals. This temporal audio scaler is described in the following paragraphs.

In general, the temporal audio scaler provides for both stretching and compressing frames or segments of the signal. Further, the temporal audio scaler is capable of providing for variable stretching and compression of particular frames or segments without the need to reference to adjacent frames. In addition, the variability of the stretching and compression provided by the temporal audio scaler allows for small variations of compression ratio from a desired ratio to be compensated for at the next frame while maintaining an overall average desired compression (or stretching) ratio by using a "carry over" technique.

For example, if a target compression ratio is 2:1 for a particular signal, and each input speech frame has 300 samples, each target output frame will nominally have 150 samples. However, if a particular frame is compressed to 180 samples instead of 150 samples, for example, then the extra 30 samples are compensated for in the next frame by setting its target compression to 120 samples. Consequently, with block sizes of 180 and 120, the average block size is still 150, with an average compression ration of 2:1. Note that depending upon the content of that next frame, compression to 120 samples may not provide optimal results. Consequently, the 120 sample example is only a target, with the actual compression, or stretching, being used to set the target compression or stretching of the subsequent frame so as to ensure the desired average.

Therefore, more than one subsequent frame may be stretched or compressed to maintain the desired average. For example, using the above example, if the frame following the frame that was compressed to 180 samples is compressed to 130 samples, then the target compression for the next frame have a target compression of 140 samples to provide an average of 150 samples over the three frames. Through use of this carry over technique any desired compression (or stretching) ratio is maintained, while keeping only a loose requirement on the length of any particular output frame.

The result of this carry over technique is that compensation for lost or delayed packets through stretching or compression is extremely flexible as each individual frame is optimally stretched or compressed, as needed, for minimizing any perceivable artifacts in the reconstructed signal. This capability of the temporal audio scaler complements a number of applications such as de-jittering, for example, which generally requires a reduced delay for minimizing artifacts.

In view of the preceding paragraphs, it should be clear that the temporal audio scaler provides for stretching and compression of a particular frame by first receiving a frame from the signal, modifying the temporal characteristics of the frame by either stretching or compressing segments of that frame, determining whether the stretching or compression of the current frame is equal to a target stretching or compression ratio, and then adding the difference, if any, between the actual and target stretching or compression ratios to the stretching or compression to be applied to the next frame or frames.

Further, prior to stretching or compressing segments of the current frame, the temporal audio scaler first determines the type of the segment. For example, in an audio signal including speech, each segment of a frame will be either a "voiced" segment that includes speech or some other voiced utterance, an "unvoiced" segment which does not include any speech or other utterance, or a "mixed" segment which includes both voiced and unvoiced portions. In order to achieve optimal results, the temporal audio scaler provides for variable stretching and compression that is specifically targeted to the particular segment type being stretched or compressed. Consequently, individualized stretching and compression methods are applied to each type of segment, i.e., voice, unvoiced, or mixed. Note that with each of the individualized methods for each segment type, the audio samples near the frame boundaries are modified as little as possible, or not at all, in order to ensure a better transition to a yet-unknown subsequent speech frame.

In making the determination of segment type, the natural periodicity of human speech is a useful guide. In general, the determination as to segment type is made as a function of how closely potentially periodic sections of the signal match. For example, in stretching or compressing a particular sample or frame of an audio signal which has not yet been played, the first step is to select a smaller segment or sub-frame from the frame to be stretched or compressed. This sub-frame is referred to as a "template" since the next step is to find a similar or matching nearby segment in the signal. Note that the matching segment may either be within the frame being stretched or compressed, or—if available—may be within the previously played frame. Consequently, in one embodiment, one or more of the most recently played frames are maintained in a temporary buffer for purposes of locating matching segments. The search for the segment matching the template is done using a conventional signal matching technique, such as, for example, a normalized cross correlation measure or similar technique. Further, in one embodiment, the search range is limited to a range compatible with the "pitch" of the signal.

As is well known to those skilled in the art, voiced sounds such as speech are produced by an oscillation of the vocal cords that modulates airflow into quasi-periodic pulses which excite resonances in the vocal tract. The rate of these pulses is generally called the fundamental frequency or "pitch." In general, the periodicity, or "pitch period" of a voiced audio signal represents the time between the largest magnitude positive or negative peaks in a time domain representation of the voiced audio signal. Although speech signals are not actually perfectly periodic, the estimated pitch frequency and its reciprocal, the pitch period, are still very useful in modeling the speech signal. Note that the reminder of the discussion makes reference to both pitch and pitch period. There are highly elaborate methods for determining pitch; however, as these concepts are well known to those skilled the art, the determination of pitch and pitch period described herein will be a basic one, based simply on finding the peak of cross correlation. However, it should be clear in view of the discussion provided herein that that any conventional method for determining pitch and pitch period may be used in temporal audio scaler.

For example, voiced portions of the signal will naturally have a higher periodicity as a result of the pitch or periodicity of human speech or utterances. Therefore, the strength of the peak of the normalized cross correlation provides insight into whether a particular segment of a frame is voiced, unvoiced, or mixed. For example, as a segment contains more speech, the normalized cross correlation peak will increase, and as a segment contains less speech, there will typically be less periodicity in the signal, resulting in a smaller normalized cross correlation peak. The value of the peak of the normalized cross correlation is then compared to predetermined thresholds for determining whether particular segments are voiced segments, unvoiced segments, or a mixture of voiced and unvoiced components, i.e., a mixed segment. In a tested embodiment, peak values between about 0.4 and about 0.95 were used to identify mixed segments, peak values greater than about 0.95 were used to identify voiced segments, and peak values less than about 0.4 were used to identify unvoiced segments.

Once the particular type of segment is identified, a segment-type specific stretching or compression process is applied to the segment for stretching or compressing the current frame as desired. For example, when stretching voiced frames, a windowed overlap-add (SOLA) approach is used for aligning and merging matching segments of the frame. However, unlike conventional systems for stretching voiced segments, the temporal audio scaler further reduces perceivable periodic artifacts in the reconstructed signal by alternating the location of the segment to be used as a reference or template, such that the template is not always taken from the end of the segment. In particular, the template may be taken from the end of the frame, the beginning of the frame, or from within the frame.

Further, in one embodiment, the temporal audio scaler also uses a variable window size, which is similar in size to the average pitch size computed for the current frame, in implementing the normalized cross correlation for further reducing perceivable artifacts in the reconstructed signal. Finally, the template is positioned such that the midpoint of the transition window is located at a low-energy point of the waveform. This positioning of the template serves to further reduce perceivable artifacts in the reconstructed signal. Note that this stretching process is repeated as many times as necessary to achieve the desired level of stretching for the current frame.

Stretching of unvoiced frames, i.e., silence, a-periodic noise, etc., is handled in a significantly different manner. In particular, unlike the process for stretching voiced frames wherein repetition of one or more segments matching the template are used for increasing the length of the frame, it is important to avoid the introduction of periodicity. The reason is that human listeners are readily able to distinguish audible periodicity in such frames. Consequently, such periodicity will appear as signal artifacts in the reconstructed signal. Therefore, rather than adding segments that match the template, the current frame is instead modified by automatically generating a different signal of a desired length and having a power spectrum similar to the current frame. This generated signal is then inserted into the middle of the current frame using a windowing function to smooth the transition points between the original frame and the generated segment. Further, in a related embodiment, the energy of the generated segment is further reduced by a predetermined percentage on the order of about 30% or so, for the purpose of further reducing any audible artifacts in the reconstructed signal.

As noted above, mixed segments represent a combination of both voiced and unvoiced components. Consequently, neither the method for stretching voice segments, or unvoiced segments, is individually appropriate for stretching mixed segments. For example, using the method for processing voiced segments will introduce noticeable artifacts into portions of the frame that are unvoiced, while using the method for processing unvoiced segments will destroy any existing periodicity in the frame. Consequently, in one embodiment, both methods are used. Specifically, signals are generated from the current mixed segment using both the voiced and unvoiced methods. These signals are then combined to produce a composite signal segment of the desired length that includes both of the signals created using the voiced and unvoiced methods.

Further, in a related embodiment, the voiced and unvoiced signals that are generated as described above are weighted as a function of the value of the normalized cross correlation peak. For example, as discussed above, the value of the normalized cross correlation peak increases as the segment becomes more periodic, i.e., as there is more speech in the segment. Therefore, weighting the voiced signal more heavily in the case where the value of the normalized cross correlation peak is higher will improve the perceived quality of the speech in the stretched segment at the cost of some periodicity, and thus potentially some perceivable artifacts in the unvoiced portion of the stretched segment. Conversely, as the value of the normalized cross correlation peak decreases, there is less periodicity in the segment. Therefore, the unvoiced signal is weighted more heavily, thereby improving the perceived quality of the unvoiced portions of the frame, at the cost of reducing the periodicity, and potentially the intelligibility of any voiced portions of the frame.

In a tested embodiment, a linear weighting from 0 to 1 corresponding to a normalized cross correlation peak of 0.45 to 0.95, respectively was used to create a voiced component for the composite signal by generating a signal of the desired length using the voiced segment method described above. Similarly, a linear weighting from 1 to 0 corresponding to a normalized cross correlation peak of 0.45 to 0.95, respectively was used to create an unvoiced component for the composite signal by generating a signal of the same desired length using the unvoiced segment method described above. These two weighted signal components are then simply added to create the composite signal.

Given the various frame types and stretching methods described above, there is still an issue of what point in the current frame is the best point to stretch that frame. For example, even within a relatively short frame, such as a 20 ms portion of the signal, there are often one or more transition points or even a few milliseconds of silence. In such cases, it is advantageous to select the specific point at which the frame is to be stretched. Therefore, in one embodiment, a stretching "quality" approach is used wherein a decision of where to stretch within the frame is made based on a combination of the energy of segments within the frame (lower energy is better), and the normalized correlation coefficient found for the segment with its match (the higher the better).

For example, in a typical case, a 20 ms frame may be divided into 4 sub-frames or segments of 5 ms each, or alternately, into potentially overlapping sub-frames or segments having approximately the estimated pitch period. If the computed energy of a particular segment is sufficiently low, then a transition is said to exist within that segment. The lowest energy segment is then selected for stretching. However, if the energy is not sufficiently low, then it is unlikely that a transition exists in the frame, and the normalized autocorrelation of the match of each segment is used to select the best match to stretch.

In general, compression of frames is handled in a similar manner as that described above for stretching of frames. For example, when compressing a frame, a template is selected from within the frame, and a search for a match is performed, as described above. Once the match is identified, the segments are windowed, overlapped and added. However, if the normalized cross-correlation is too small, then as noted above, the segment is likely an unvoiced segment. In this case, either a random or predetermined shift is used along with a windowing function such as a constant square-sum window to compress the frame to the desired amount.

Further, the selection of the particular segments within each frame to compress is an important consideration. For example, rather than compress all segments of a frame equally, better results are typically achieved by first determining the type of segment, as described above, then selectively compressing particular segments of the frame. For example, compressing segments that represent speech, silence or simple noise, while avoiding compression of unvoiced segments or transients, produces a reconstructed signal having less perceivable artifacts. If sufficient compression cannot be accomplished by compressing segments representing speech, silence or simple noise, then non-transitional unvoiced segments are compressed in the manner described above. Finally, segments including transitions are compressed if sufficient compression can not be achieved through compression of the voiced segments or non-transitional unvoiced segments. This hierarchical approach to compression serves to limit perceivable artifacts in the reconstructed signal. Further, as described above, the "carry-over" process is also used to compress subsequent frames by greater amounts where the current frame is not compressed to the target compression ratio because of its content type.

In view of the above summary, it is clear that the temporal audio scaler provides a unique system and method for stretching and compressing frames of a received audio signal while minimizing perceivable artifacts in a reconstruction of that signal. In addition to the just described benefits, other advantages of the system and method for stretching and compressing audio signal segments will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
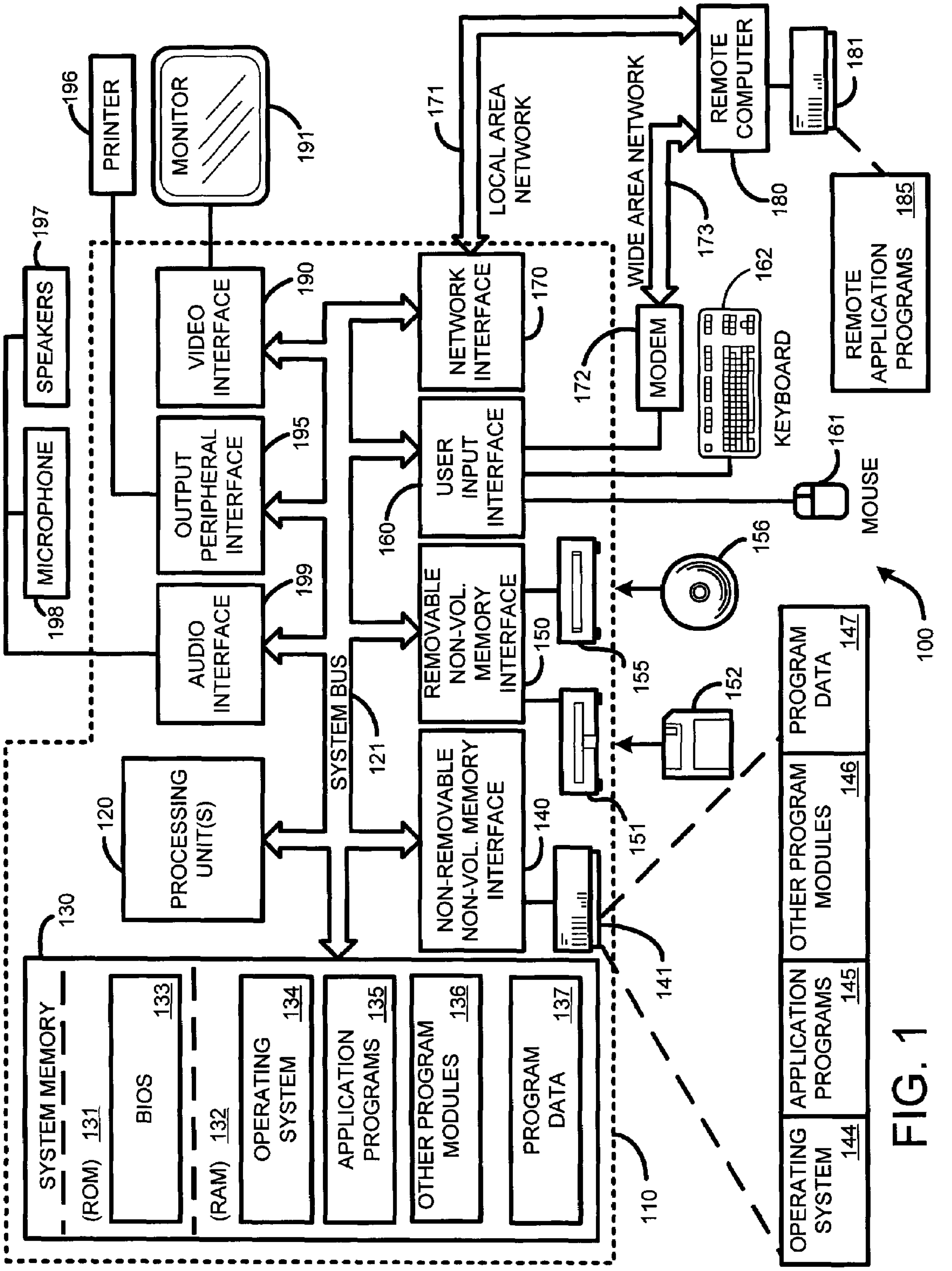
FIG. 1 is a general system diagram depicting a general-purpose computing device constituting an exemplary system for stretching and compressing segments of an audio signal.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, digital telephones, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

In addition, the computer 110 may also include a speech input device, such as a microphone 198 or a microphone array, as well as a loudspeaker 197 or other sound output device connected via an audio interface 199. Other input devices (not shown) may include a joystick, game pad, satellite dish, scanner, radio receiver, and a television or broadcast video receiver, or the like. These and other input devices are often connected to the processing unit 120 through a user input interface 160 that is coupled to the system bus 121, but may be connected by other interface and bus structures, such as, for example, a parallel port, game port, or a universal serial bus (USB). A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a "temporal audio scaler" for automatically stretching and compressing signal frames in a digital audio signal.

2.0 Introduction:

The more traditional application of time-scale modification of audio signals is in slowing down or speeding up the overall time scale of a signal, many times to reduce listening time, or to improve intelligibility. Besides that application, in the last few years time-scale modification of audio signals containing speech has also been used for improving the quality of signals transmitted across lossy and delay prone packet-based networks such as the Internet and then reconstructed on a client computer or receiver. For example, in many applications it is desirable to stretch or compress one or more frames of an audio signal containing speech.

Typically, stretching is used for enhance intelligibility of speech in the signal, replacing lost, overly delayed, or noisy frames, or in de-jittering algorithms to provide additional time when waiting for delayed speech packets. Similarly, shortening or compression of the audio signal is typically used for reducing listening time, reducing transmission bitrate of a signal, speeding up frames of the signal to reduce overall transmission time, and reducing transmission delay so that the signal can be transmitted closer to real-time following some type of processing of the signal frames. In view of these uses, there is a clear need for a system and method for stretching and compression of speech that provides a high quality output while minimizing any perceivable artifacts in a reconstructed signal.

To address this need for high quality audio stretching and compression, an adaptive "temporal audio scaler" is provided for automatically stretching and compressing frames of audio signals received across a packet-based network. The temporal audio scaler described herein provides a system and method for temporal scaling, including both stretching and compression, of audio signals. This temporal audio scaler is described in the following paragraphs.

In general, the temporal audio scaler provides for localized time-scale modification of audio frames such as, for example, a section of speech in an audio signal. The approach described herein applies to both stretching and compressing frames of the signal. Further, the temporal audio scaler is capable of providing for variable stretching and compression of particular frames without the need to reference to adjacent frames, which may be important in applications where neighboring segments may be unavailable (or lost). Further, the variability of the stretching and compression provided by the temporal audio scaler allows for small variations of compression ratio from a desired ratio to be compensated for at the next frame while maintaining an overall average desired compression (or stretching) ratio by using a "carry over" technique, as described in Section 3.1, which variably stretches or compresses one or more subsequent frames to compensate for any out of average stretching or compression of the current frame.

2.1 System Overview:

As noted above, the temporal audio scaler provides for stretching and compression of a particular frame (or segment) by first receiving or extracting the frame from the audio signal, modifying the temporal characteristics of the frame by either stretching or compressing that frame, determining whether the stretching or compression of the current frame is equal to a target stretching or compression ratio, and then adding the difference, if any, between actual and target stretching or compression ratios to the stretching or compression to be applied to the next frame or frames.

Further, prior to stretching or compressing each frame, the temporal audio scaler first determines the type of the current segment, and then applies a stretching or compression process that is specific to the identified segment type. For example, in an audio signal including speech, each segment of any particular frame will be either a "voiced" segment that includes speech or some other voiced utterance, an "unvoiced" segment which does not include any speech or other utterance, or a "mixed" segment which includes both voiced and unvoiced components.

In order to achieve optimal results, the temporal audio scaler provides for variable stretching and compression that is specifically targeted to the particular segment type being stretched or compressed. Consequently, once the particular type of segment is identified, i.e., voice, unvoiced, or mixed, the stretching or compression process specific to the particular segment type is applied to the segment frame for stretching or compressing the current frame as desired. Note that with each of the individualized methods for each frame type, the end of each frame is modified as little as possible, or not at all, in order to ensure a better transition to a yet-unknown speech segment In addition, given the various segment types and stretching methods described above, there is still an issue of what point in the current frame is the best point at which to stretch that frame. For example, even within a relatively short frame, such as a 20 ms portion of the signal, there are often one or more transition points or even a few milliseconds of silence. In such cases, it is advantageous to select the specific point at which the frame is to be stretched. Therefore, in one embodiment, a stretching "quality" approach is used wherein a decision of where to stretch is made based on a combination of the energy of each segment (lower energy is better), and the normalized correlation coefficient found for that segment with its match (the higher the better).

For example, in a typical case, a 20 ms frame may be divided into 4 sub-frames or segments of 5 ms each, or alternately, into potentially overlapping sub-frames having approximately the estimated pitch period. If the computed energy of a particular sub-frame is sufficiently low, then a transition is said to exist within that frame. The lowest energy sub-frame is then selected for stretching. However, if the energy is not sufficiently low, then it is unlikely that a transition exists in the frame, and the normalized autocorrelation of the match of each sub-frame is used to select the best match to stretch.

In general, compression of segments within a frame is handled in a similar manner as that described above for stretching of segments. For example, when compressing a segment, a template is selected from within the segment, and a search for a match is performed. Once the match is identified, the segments are windowed, overlapped and added. However, if the normalized cross-correlation is too small, then as noted above, the segment is likely an unvoiced segment. In this case, either a random or predetermined shift is used along with a windowing function such as a constant square-sum window to compress the segment to the desired amount.

Further, the selection of which particular segments to compress is also an important consideration. For example, rather than compressing all segments in a frame equally, better results are typically achieved by first determining the type of segment, as described above, then selectively compressing particular segments based on their type. For example, compressing segments that represent speech, silence or simple noise, while avoiding compression of unvoiced segments or transients, produces a reconstructed signal having less perceivable artifacts. Next, if sufficient compression cannot be accomplished by compressing segments representing speech, silence or simple noise, then non-transitional unvoiced segments are compressed in the manner described above. Finally, segments including transitions are compressed if sufficient compression can not be achieved through compression of the voiced segments or non-transitional unvoiced segments. Of course, if compression opportunities within each type cannot be computed in advance, the best segment to compress can be computed at each step. This hierarchical approach to compression serves to limit perceivable artifacts in the reconstructed signal.

Figure 2:
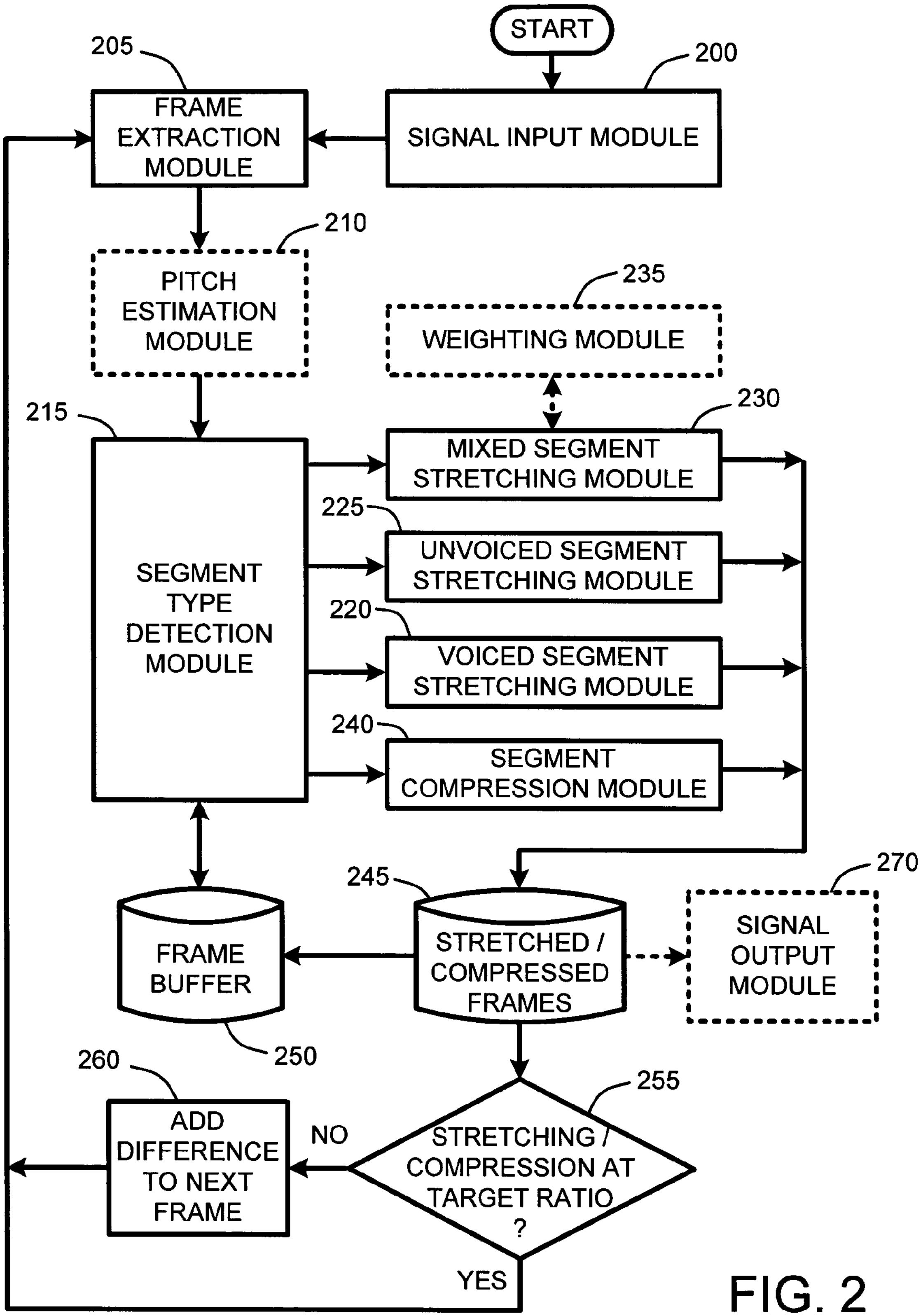
FIG. 2 illustrates an exemplary architectural diagram showing exemplary program modules for stretching and compressing segments of an audio signal.

2.2 System Architecture:

The processes summarized above are illustrated by the general system diagram of FIG. 2. In particular, the system diagram of FIG. 2 illustrates the interrelationships between program modules for implementing a temporal audio scaler for stretching and compressing frames of an audio signal. It should be noted that the boxes and interconnections between boxes that are represented by broken or dashed lines in FIG. 2 represent alternate embodiments of the temporal audio scaler described herein, and that any or all of these alternate embodiments, as described below, may be used in combination with other alternate embodiments that are described throughout this document.

As illustrated by FIG. 2, a system and method for real-time stretching and compressing of frames of an audio signal begins by receiving an input signal via a signal input module 200. This signal input module 200 receives an audio signal, which may have just been produced, or may have been stored in the computer, or may have been decoded from a packetized audio signal transmitted across a packet-based network, such as, for example, the Internet, or other packet-based network including conventional voice-based communications networks. As the signal input module 200 receives or decodes the packets, they are provided to a frame extraction module 205. The frame extraction module 205 then extracts a current frame from the incoming signal.

In one embodiment, the frame extraction module 205 then provides the current frame to a pitch estimation module 210 for estimating the pitch period of either or both the entire frame, or of the segments within that frame. In this embodiment, segments are chosen to be approximately the length of the average pitch period of the frame. However, the actual segment length may also be chosen for efficiency of computation, e.g., using smaller segments makes FFT computations easier. Further, as described in further detail in section 3.2, these pitch period-based segments may be overlapping. The segments comprising the current frame are then provided to a segment type detection module 215.

Alternately, the frame extraction module 205 provides the current frame directly to the segment type detection module 215 which simply divides the frame into a number of segments of equal length.

In either case, the segment type detection module 215 then makes a determination of the type of segments in the current frame, and provides the current frame to the appropriate stretching or compression module, 220, 225, 230, or 240, respectively. In particular, the segment type detection module 215 first determines whether the current frame includes voiced segments, unvoiced segments, or mixed segments. Where the frame is to be stretched, the segment type detection module then provides the current frame to either a voiced segment stretching module 220, an unvoiced segment stretching module 225, or a mixed segment stretching module 230. Where the current frame is to be compressed, the segment type detection module then provides the current frame to a segment compression module 240.

The voiced segment stretching module 220 operates as described in detail in Section 3.2.1 by using a windowed synchronous overlap-add (SOLA) approach for aligning and merging sections of the signal matching the template with the frame. However, unlike conventional systems for stretching voiced segments, the voiced segment stretching module 220 of the temporal audio scaler further reduces perceivable periodic artifacts in the reconstructed signal by alternating the location of the segment to be used as a reference or template, such that the template is not always taken from the end of the segment as with conventional speech stretching algorithms. In particular, the template may be taken from the end of the frame, the beginning of the frame, or from various positions from within the frame.

In contrast, the unvoiced segment stretching module 225 operates as described in detail in Section 3.2.2 for stretching the current segment or frame by generating one or more synthetic signal segments which are then inserted into the current segment or frame. In general, the synthetic segments are created in any desired length by synthesizing an aperiodic signal with a spectrum similar to the current frame. Furthermore, it is desired that the synthesized signal be uncorrelated with the original frame so as to avoid the introduction of periodicity into the synthesized signal.

For example, in one embodiment, this is achieved by computing the Fourier transform of all or part of the current frame, depending upon whether single or multiple segments are to be inserted, introducing a random rotation of the phase into the FFT coefficients, and then simply computing the inverse FFT for each segment. This produces signal segments with a similar spectrum, but no correlation with the original segment. In addition, longer signals can be obtained by zero-padding the signal before computing the FFT. These synthetic signals are then inserted into the middle of the current segment or frame using a windowing function to smooth the transition points between the original segment and the generated segment.

The mixed segment stretching module 230 operates as described in detail in Section 3.3 by using a combination of both the voiced and unvoiced methods described above. Specifically, signals are generated from the current mixed segment using both the voiced and unvoiced methods. These signals are then combined to produce a composite signal that includes both the voiced and unvoiced signals. In one embodiment, the components forming the composite signal are weighted, via a weighting module 235, relative to their proportional content of either voiced or unvoiced data, as determined via the aforementioned normalized cross correlation peak.

The segment compression module 240 operates as described in Section 3.4. In general, compression of segments is handled in a similar manner to that described above for stretching of segments. In particular, segment compression is handled on a frame or segment type basis as with the stretching of frames or segments described above. Note that for purposes of clarity in FIG. 2, segment compression is shown as a single program module entitled "segment compression module 240," rather than using three program modules to represent compression of the various segment types. However, it should be appreciated that as with stretching of the basic segment types, i.e., voiced segments, unvoiced segments and mixed segments, compression of these same segment types is still handled using different methods that are specific to each segment type.

In particular, when compressing a voiced segment, a template is selected from within the segment, and a search for a match is performed. Once the match is identified, the segments are windowed, overlapped and added, cutting out the signal between the template and the match. As a result, the segment is shortened, or compressed. In contrast, when compressing an unvoiced segment, either a random or predetermined shift is used along with a windowing function such as a constant square-sum window to compress the segment to the desired amount. Finally, mixed segments are compressed using a weighted combination of the voiced and unvoiced methods. However, as discussed in further detail in Section 3.4, there is a clear preferential order (voiced first, followed by unvoiced, followed by mixed segments) for compressing the various segment types for achieving the desired or target compression ratio over one or more frames. Note that as with stretching of frames, care is taken during compression of segments to avoid the modification of segment endpoints so that transients or audible artifacts are not introduced between frames or segments.

In each case, voiced, unvoiced, or mixed, the corresponding stretching or compression module, 220, 225, 230, or 240, respectively, then provides the stretched or compressed frames to a buffer of stretched and compressed frames 245. Note that a temporary frame buffer 250 is used in one embodiment to allow searching of the recent past in the signal for segments matching the current template. Once the stretched or compressed segments have been provided to the buffer of stretched and compressed frames 245, a decision 255 is made as to whether the desired or target stretching or compression has been achieved. If not, then the difference between the target stretching or compression is factored into the target compression for the next frame by simply adding the difference between the actual and target values to the next frame 260. In either case, at this point, a next frame is extracted 205 from the input signal, and the processes described above are repeated until the end of the input signal has been reached, or the process is terminated. In some applications, if no signal is readily available at the input, a frame may be selected from signal still present in the buffer 245.

Note that the buffer of stretched and compressed frames 245 is available for playback or further processing, as desired. Consequently, in one embodiment, a signal output module 270 is provided for interfacing with an application for outputting the stretched and compressed frames. For example, such frames may be played for a listener as a part of a voice-based communications system.

3.0 Operation Overview:

The above-described program modules are employed in a temporal audio scaler for providing automatic temporal scaling of segments of an audio file. In general, as summarized above, this temporal scaling provides for variable stretching and compression that may be performed on segments as small as a single signal frame. The variability of the stretching and compression provided by the temporal audio scaler allows for small variations of compression ratio from a desired ratio to be compensated for at the next frame while maintaining an overall average desired compression (or stretching) ratio using a "carry over" technique. The following sections provide a detailed operational discussion of exemplary methods for implementing the program modules described in Section 2.

3.1 Carry-Over for Maintaining a Target Compression/Stretching Ratio:

As noted above, the temporal audio scaler uses a "carry over" process for variable compression or stretching of frames while maintaining a desired compression/stretching ratio for the signal as a whole. For example, if a target compression ratio is 2:1 for a particular signal, and each input frame has 300 samples, each target output frame will nominally have 150 samples. However, if a particular frame is compressed to 180 samples instead of 150 samples, for example, then the extra 30 samples are compensated for in the next frame by setting its target compression to 120 samples. Consequently, with block sizes of 180 and 120, the average block size is still 150, with an average compression ratio of 2:1. Note that depending upon the content (i.e., the segment type) of that next frame, compression to 120 samples may not provide optimal results. Consequently, the 120 sample example is only a target, with the actual compression, or stretching, being used to set the target compression or stretching of the subsequent frame so as to ensure the desired average.

Therefore, more than one subsequent frame may be stretched or compressed to maintain the desired average. For instance, using the above example, if the frame following the frame that was compressed to 180 samples is compressed to 130 samples, then the target compression for the next frame is a target compression of 140 samples in order to provide an average of 150 samples over the three frames. Through use of this carry over technique any desired compression (or stretching) ratio is maintained, while keeping only a loose requirement on the length of any particular output frame.

The result of this carry over technique is that compensation for lost or delayed packets through stretching or compression is extremely flexible as each individual frame is optimally stretched or compressed, as needed, for minimizing any perceivable artifacts in the reconstructed signal. This capability of the temporal audio scaler complements a number of applications such as, for example, de-jittering, and packet loss concealment in a real-time communications system.

3.2 Content-Based Stretching of Segments:

As noted above, prior to stretching or compressing each frame, the temporal audio scaler first determines the type of the current frame, and then applies a frame-type specific stretching or compression process to the current frame. For example, in an audio signal including speech, each frame will be either a "voiced" frame that includes speech or some other voiced utterance, an "unvoiced" frame which does not include any speech or other utterance, or a "mixed" frame which includes both voiced and unvoiced components. In order to achieve optimal results, the temporal audio scaler provides for variable stretching and compression that is specifically targeted to the particular frame type being stretched or compressed. Consequently, separate unique stretching and compression methods are applied to each type of frame, i.e., voice, unvoiced, or mixed.

Therefore, the determination as to whether that frame is voiced, unvoiced, or mixed is made prior to stretching or compressing the current frame. In making this determination, the natural periodicity of human speech is a useful guide. In general, this determination as to segment type is made as a function of how closely potentially periodic sections of the signal match. For example, in stretching or compressing a particular sample of an audio signal which has not yet been played, the first step is to select a smaller segment or sub-sample from the sample to be stretched or compressed. This sub-sample is referred to as a "template" since the next step is to find a similar or matching nearby segment in the signal. Note that the matching segment may either be within the sample being compressed, or may be within the previously played segment. Consequently, whenever available, the most recently played segment is maintained in a temporary buffer for purposes of locating matching segments. The search for the segment matching the template is done using a conventional signal matching technique, such as, for example, a normalized cross correlation measure or similar technique. Further, the search range is preferably limited to a range compatible with the "pitch" of the signal.

As is well known to those skilled in the art, voiced sounds such as speech are produced by an oscillation of the vocal cords that modulates airflow into quasi-periodic pulses which excite resonances in the vocal tract. The rate of these pulses is generally called the fundamental frequency or "pitch." In general, the periodicity, or "pitch period" of a voiced audio segment represents the time between the largest magnitude positive or negative peaks in a time domain representation of the voiced audio segment. Although speech signals are not actually perfectly periodic, the estimated pitch frequency and its reciprocal, the pitch period, are still very useful in modeling the speech signal. Note that the reminder of the discussion makes reference to both pitch and pitch period. There are highly elaborate methods for determining pitch. However, as these concepts are well known to those skilled the art, the determination of pitch and pitch period described herein will be a basic one, based simply on finding the peak of cross correlation.

Consequently, portions of the signal having voiced segments will naturally have a higher periodicity as a result of the pitch or periodicity of human speech or utterances. Therefore, the strength of the peak of the normalized cross correlation provides insight into whether a particular segment is voiced, unvoiced, or mixed, while the location of the peak provides an estimate of the actual value of the pitch period. For example, as a segment contains more speech, the normalized cross correlation peak will increase, and as a segment contains less speech, there will typically be less periodicity in the signal, resulting in a smaller normalized cross correlation peak.

The value of the peak of the normalized cross correlation is compared to predetermined thresholds for determining whether particular segments are voiced segments, unvoiced segments, or a mixture of voiced and unvoiced segments, i.e., a mixed segment. In a tested embodiment, peak values between about 0.4 and about 0.95 were used to identify mixed segments, peak values greater than about 0.95 were used to identify voiced segments, and peak values less than about 0.4 were used to identify unvoiced segments. Once the particular type of segment is identified, a segment-type specific stretching or compression process is applied to the current frame for stretching or compressing that frame as desired. In another tested embodiment, no frames were classified as mixed, and the threshold between voiced and unvoiced frames was set at 0.65.

3.2.1 Stretching Voiced Segments:

When stretching voiced segments in a frame, a windowed overlap-add (SOLA) approach is used for aligning and merging matching portions of the segment. In general, a window is divided up in a raising part, wa[n], and a decaying part, wb[n]. The overlapping signals are then multiplied by these windows to smooth the transition. More specifically, the signal extending to the past will be multiplied by the decaying window, while the signal extending to the future will be multiplied by the rising window. Further, because the aligned signals are correlated, a conventional window, such as, for example, a Hanning window which goes to zero and sums to one when added, i.e., wa[n]+wb[n]=1, may be used here for eliminating or reducing artifacts at the boundaries of stretched portions of a frame. Such windows are well known to those skilled in the art.

However, unlike conventional systems for stretching voiced segments, the temporal audio scaler further reduces perceivable periodic artifacts in the reconstructed signal by alternating the location of the segment to be used as a reference or template, such that the template is not always taken from the end of the segment as with conventional speech stretching algorithms. In particular, the template may be taken from the end of the frame, the beginning of the frame, or at various positions from within the frame. For example, in one embodiment the template is positioned such that the midpoint of the transition window is located at a low-energy point of the waveform. This positioning of the template serves to further reduce perceivable artifacts in the reconstructed signal. Note that this stretching process is repeated as many times as necessary to achieve the desired level of stretching for the current frame.

Figure 3:
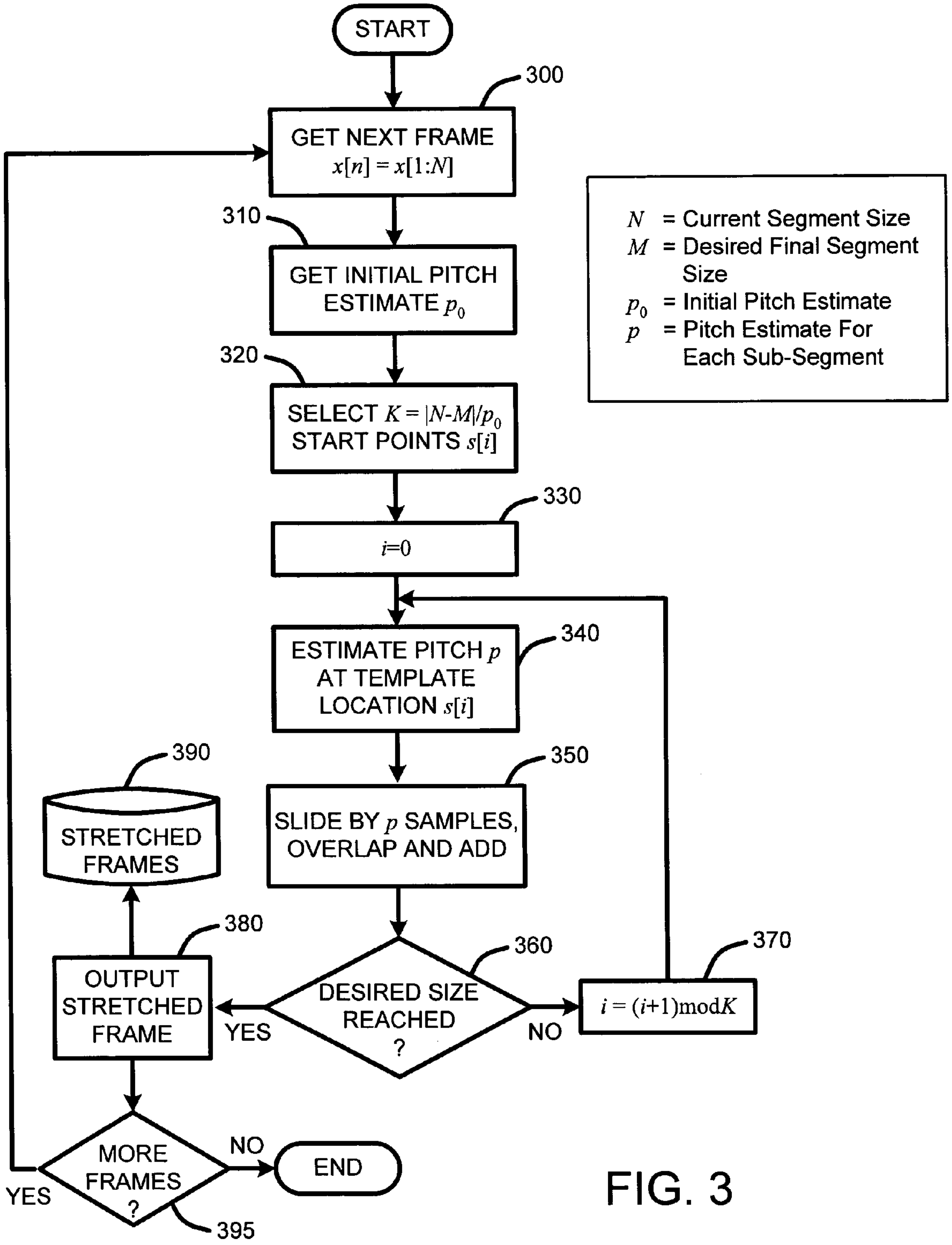
FIG. 3 illustrates an exemplary system flow diagram for stretching voiced segments of an audio signal.

In a tested embodiment, as illustrated by FIG. 3, an initial estimate of the pitch is used to estimate how many times the segment needs to be stretched (or compressed) in order to achieve the desired length. In particular, each iteration will compress or stretch the signal by approximately one pitch period, so a good estimate is of the number of iterations, K, is provided by Equation 1, as follows:

$$K=|M-N|/p_0 \qquad \text{Equation 1}$$

where $p_0$ is the initial pitch estimate of the current segment. The templates are then uniformly distributed over the segment to be stretched. Further, if past history of the signal is available, the match is searched for in the region before the template. Alternately, if no past history is available, the search for a match will be done either before or after the current segment, depending upon where more data is available.

Specifically, as illustrated by FIG. 3, the process begins by getting a next current frame x[n] 300 from the incoming audio signal. Then, an initial pitch estimate $p_0$ is computed 310 for the using conventional methods. In one embodiment, this initial pitch estimate for the current frame is simply the average pitch of the received frames.

Next, the number of iterations needed for stretching the signal is estimated 320 as a function of the initial pitch estimate, $p_0$, the current segment size, and the desired frame size. For example, because each iteration will stretch or compress the signal by approximately one pitch period, the number of iterations can be easily estimated using a method such as that offered by Equation 1, for example. Clearly, by dividing the difference between the current segment size and the desired size, and dividing by the estimated pitch size, the result is a good estimate for the number of iterations needed to stretch or compress the segment to the desired size.

Once the number of iterations has been estimated 320, an iteration counter, i, is initialized to zero 330. The pitch p is then estimated 340, again using conventional techniques, for a smaller portion of the current segment, i.e., a sub-segment or sub-frame, at a current sample location, s[i], within the current segment. A conventional windowed overlap-add (SOLA) approach 350 is then used to slide the template by the pitch period, overlap the template, and add to the segment to stretch the segment by the length of the pitch period of the segment at position s[i].

A determination is then made 360 as to whether the desired segment size has been achieved. If the desired size has not been reached 360, then the position of the current sample location, s[i], is adjusted as a function of the number of iterations, K, and the steps described above for estimating the pitch, p, 340 and windowing the 350 to stretch the segment are repeated until the desired segment size has been achieved 360. Finally, once the desired size has been reached 360, then the stretched frame is output 380 to a buffer of stretched frames 390 for playback or use, as desired. Further, a determination is also made at this time as to whether there are more frames to process 395. If there are no more frames to process 395, then the process terminates. However, if there are more frames to process 395, then a next current frame is retrieved 300, and the steps described above, 310 through 395 repeat.

Further, when selecting templates from the end of the frame, matching of the template is accomplished as with most conventional speech stretching systems by searching in the past, i.e., by searching earlier in the signal, for matching segments. Therefore, in this case, it may be necessary to maintain a buffer of one or more already played frames, depending upon frame and template length. The matching segments are then aligned and merged using conventional techniques, as described with respect to step 350, thereby stretching the length of the current frame.

Alternately, unlike conventional speech stretching systems, the temporal audio scaler is also capable of drawing templates from the beginning of a frame. In this case, it may be necessary to search in the future, i.e., later in the signal, for matching segments, especially if the past frame is not available. Consequently, in such a case, it may be necessary to have buffered frames with a delay to allow for stretching of the current frame prior to playing that frame by searching into the local future of the signal for segments matching the current template. This can be accomplished by requiring the frame size to be long enough as to contain several pitch periods.

Further, also unlike conventional speech stretching systems, in addition to selecting templates from either the beginning or the end of the frame, templates may also be selected from locations within the frame somewhere between the beginning and the end of the current frame. In this case, matches to the templates are identified by searching either into the past or future, as described above, depending upon the location of the selected template within the current frame.

In one embodiment, selection of the template location is alternated to minimize the introduction of perceivable artifacts resulting from too much uniform periodicity at any point within the current frame. This capability becomes especially important as the amount of stretching to be applied to any given frame increases beyond more than a few pitch periods. In fact, because more than one stretching operation may be required to achieve the desired frame length for any given frame, different templates may be selected for each operation within the current frame for repeated stretching operations, in the manner described above, so that periodicity at any given point does not result in noticeable artifacts.

Further, in one embodiment, the temporal audio scaler also uses a variable segment size, which is similar in size to the average pitch period computed for the current frame. Further, in a related embodiment, the number of stretching iterations is then estimated by dividing the desired or target length of stretching for the current frame by the average estimated pitch period for the current frame, and then rounding up to the next whole number. In this embodiment, the current frame is then divided into a number of templates equal to the estimated number of stretching iterations, with each template having a size equal to the average estimated pitch period. These templates are then equally spaced throughout the current frame. As a result, the templates may be overlapping, depending upon the template length, the number of templates, and the frame length.

In a related embodiment, to ensure artifacts are minimized in the stretching operation, energy within each template is minimized by ensuring that the templates are positioned within the frame such that each template includes only one local signal peak. In particular, templates are positioned approximately uniformly within the frame such that any local signal peak within any particular template is around approximately ⅓ to ½ or so of the length of the template from either edge of the template. Such positioning of the templates within the frame serves to ensure that each template will encompass only one local signal peak. As a result, the energy of the signal encompassed by each template is minimized, thereby allowing for stretching with reduced artifacts in the stretched signal.

3.2.2 Stretching Unvoiced Segments:

Stretching of unvoiced segments, i.e., silence, noise, other aperiodic sounds, etc., is handled in a significantly different manner. In particular, unlike the process for stretching voiced segments wherein repetition of one or more segments matching the template are used for increasing the length of the segment, herein it is important to avoid the introduction of periodicity. The reason is that human listeners are readily able to identify artificially introduced periodicity in such segments, and such periodicity will appear as signal artifacts in the reconstructed stretched signal. Consequently, rather than adding segments that match the template, the current segment is instead modified by generating a different signal segment of a desired length and having a power spectrum similar to the current segment. This generated signal is then inserted into the middle of the current segment using a windowing function to smooth the transition points between the original segment and the generated segment. Further, in a related embodiment, the energy of the generated segment is further reduced by a predetermined percentage on the order of about 30% or so, for the purpose of further reducing any noticeable artifacts in the reconstructed signal.

In still another related embodiment, rather than using a single synthetic segment to stretch an unvoiced frame, multiple synthetic segments are generated and inserted into various points within the original unvoiced frame to achieve the total desired frame length. This embodiment also offers the advantage that smaller synthetic segments can be computed using smaller FFT's, and thus may require reduced computational overhead. Note that this embodiment appears to produce perceptually superior stretched frames in comparison to using a single longer synthetic signal segment. In this embodiment, various segments of the frame are stretched, or compressed, equally. For example, in a tested embodiment, the size of the FFT is set to a predefined length such as, for example, 128 samples.

The number of overlapping segments that will be needed to obtain the desired final size is then computed. Note that this computation should consider the fact that it is undesirable to modify either the beginning or the end of the frame. This can be achieved by not changing the first and last segments, then simply blending in and out (overlap/add) the neighboring (possibly synthesized) segments. Consequently, the first and last half-segments of the frame are subtracted from the frame length in computing the number of synthetic segments to be computed. Therefore, the number of equal sized synthetic segments n (and thus the number of original segments in the current frame) is thus easily computed by Equation 2 as follows:

$$n = \frac{\text{final\_size}*2}{\text{FFT\_Size}} - 1 \quad \text{Equation 2}$$

The n computed synthetic segments are then uniformly spread across the frame by inserting a segment into the center of each of the n segments of the frame.

In either case, the synthetic signal segments are created to have a similar power spectrum to the current frame. This can be accomplished by computing the Fourier transform of all or part of the current frame, depending upon whether single or multiple segments are to be inserted, introducing a random rotation of the phase into the FFT coefficients, and then simply computing the inverse FFT for each segment. This produces signal segments with a similar spectrum, but no correlation with the original segment. In addition, longer signals can be obtained by zero-padding the signal before computing the FFT.

Note that the example provided above is not intended to limit the scope of the temporal audio scaler to the particular embodiment described with respect to creation of synthetic segments. In fact, those skilled in the art should appreciate that there are many conventional techniques for producing a signal having a spectrum similar, and uncorrelated, to the original signal. Any such technique, including, for example, LPC filtering of a random signal, and other conventional techniques may also be used for the creation of such synthetic signal segments.

As noted above, the current frame is then split, either in two, or into multiple sections, and the synthesized segments are then simply inserted into the split portions of the frame, with windowing and overlapping to smooth the transitions between the synthetic segments and the original frame. Note that in either of the aforementioned embodiments, the beginning and end of the segment or frame is left completely unchanged. As a result, this process avoids the creation of artifacts that might otherwise result from non-matching frame or segment boundaries.

Further, unlike the windowing used for voiced segments, a preferred overlapping smoothing window used is different here. For example, while the overlapping portions of the signal used for stretching the voiced segments are correlated, the overlapping portions of the signal in the unvoiced case are theoretically uncorrelated. Therefore, better results, i.e., reduced artifacts, are achieved at boundary points by using a window such as a conventional sine window which keeps the energy constant and sums to one when squared and added, i.e., $(wa[n])^2+(wb[n])^2=1$. Such windows are well known to those skilled in the art. This process is generally represented by steps 400 through 480 of FIG. 4.

Figure 4:
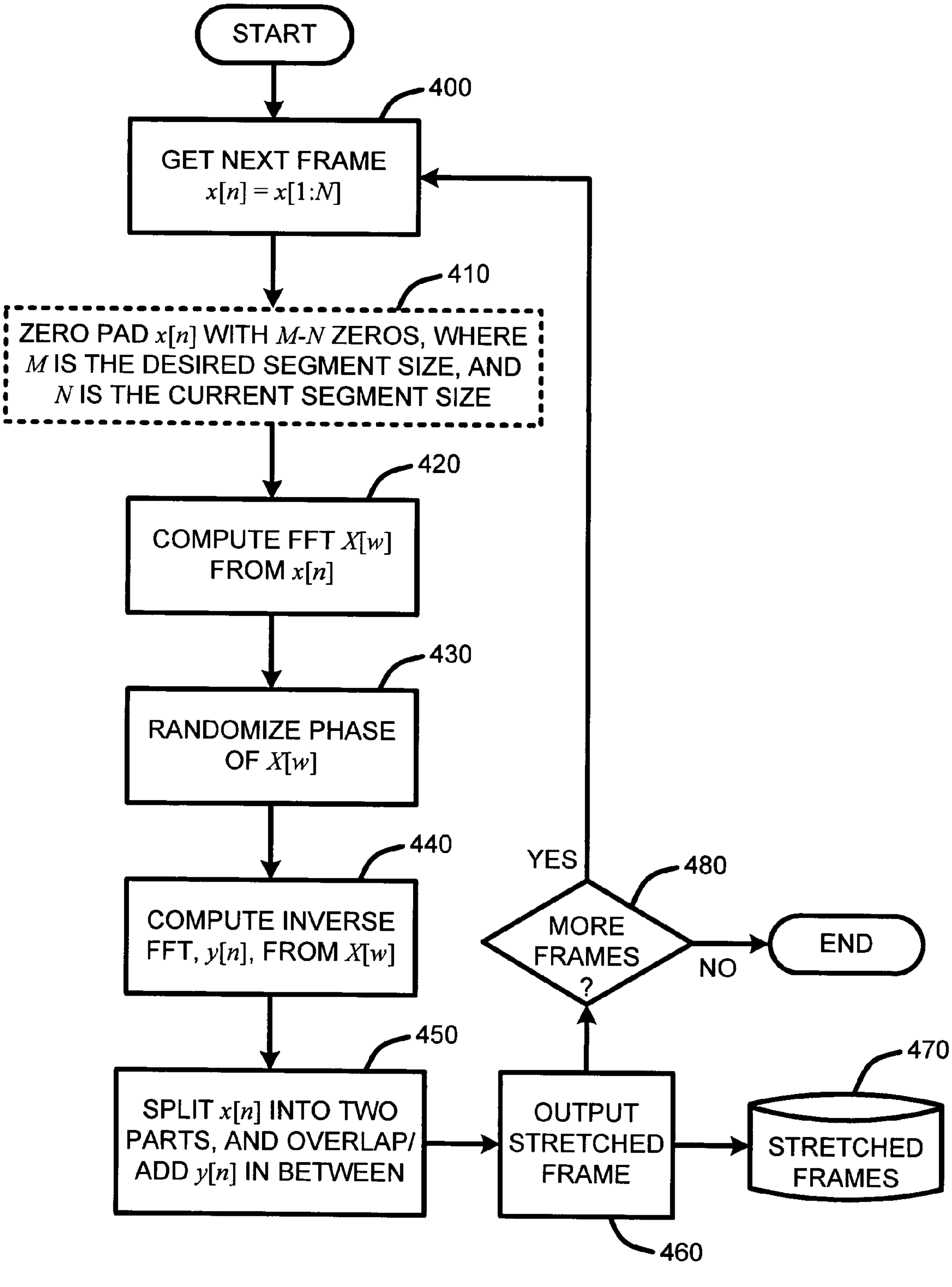
FIG. 4 illustrates an exemplary system flow diagram for stretching unvoiced segments of an audio signal.

In particular, as illustrated by FIG. 4, one embodiment for creating synthetic signal segments from a current signal frame begins by getting a next current frame x[n] 400 from the incoming audio signal. Next, in one embodiment, the current frame, or segment, x[n], is zero padded 410 so that the resulting synthetic segment will be of sufficient length to achieve the desired frame length. In particular, the amount of zero padding 410 in this embodiment is determined by simply padding x[n] with a number of zeros equal to the difference in samples between the current frame or segment length, and the desired frame or segment length.

Next, given x[n], whether or not it has been zero padded 410, the FFT is computed 420. The phase of this FFT is then randomized 430. Next, the inverse FFT, y[n], is computed 440 from this FFT having the randomized phase. The result of this process, steps 420 through 440, is a synthetic frame or segment, y[n], having a similar spectrum, but no correlation with the original segment, x[n]. The original (non-zero padded) frame or segment x[n] is then split into two parts, and y[n] is inserted between those two parts, and seamlessly added using the aforementioned conventional overlap/add process 450, such as, for example, a conventional sine window to create a stretched frame.

The stretched frame is then output 460 to a buffer of stretched frames 470 for playback or use, as desired. Further, a determination is also made at this time as to whether there are more frames to process 480. If there are no more frames to process 480, then the process terminates. However, if there are more frames to process 480, then a next current frame is retrieved 400, and the steps described above, 410 through 480 repeat.

In the aforementioned embodiment using multiple synthetic segments for stretching the frame, the synthetic segments were all of equal length and uniformly distributed. However, in a related embodiment, those parts of the frame exhibiting lower energy are stretched more than those parts of the frame having higher energy rather than using a simple uniform distribution. This embodiment serves to further reduce artifacts. However, even this embodiment, while superior to the previous embodiment, may change the signal more than desired, thus resulting in audible differences that may be perceived by the listener.

Consequently, in yet another related embodiment the amount of data which is modified from the original content is reduced. As a result, the partially synthetic signal frame or segment that is produced is perceptually more similar to the original signal to a human listener. In particular, in this embodiment, rather then simply creating a number of synthetic segments, a mix of synthetic and copied original segments are used in a way that preserves as much of the original signal as possible, while minimizing perceivable artifacts in the stretched segments or frames.

Figure 5:
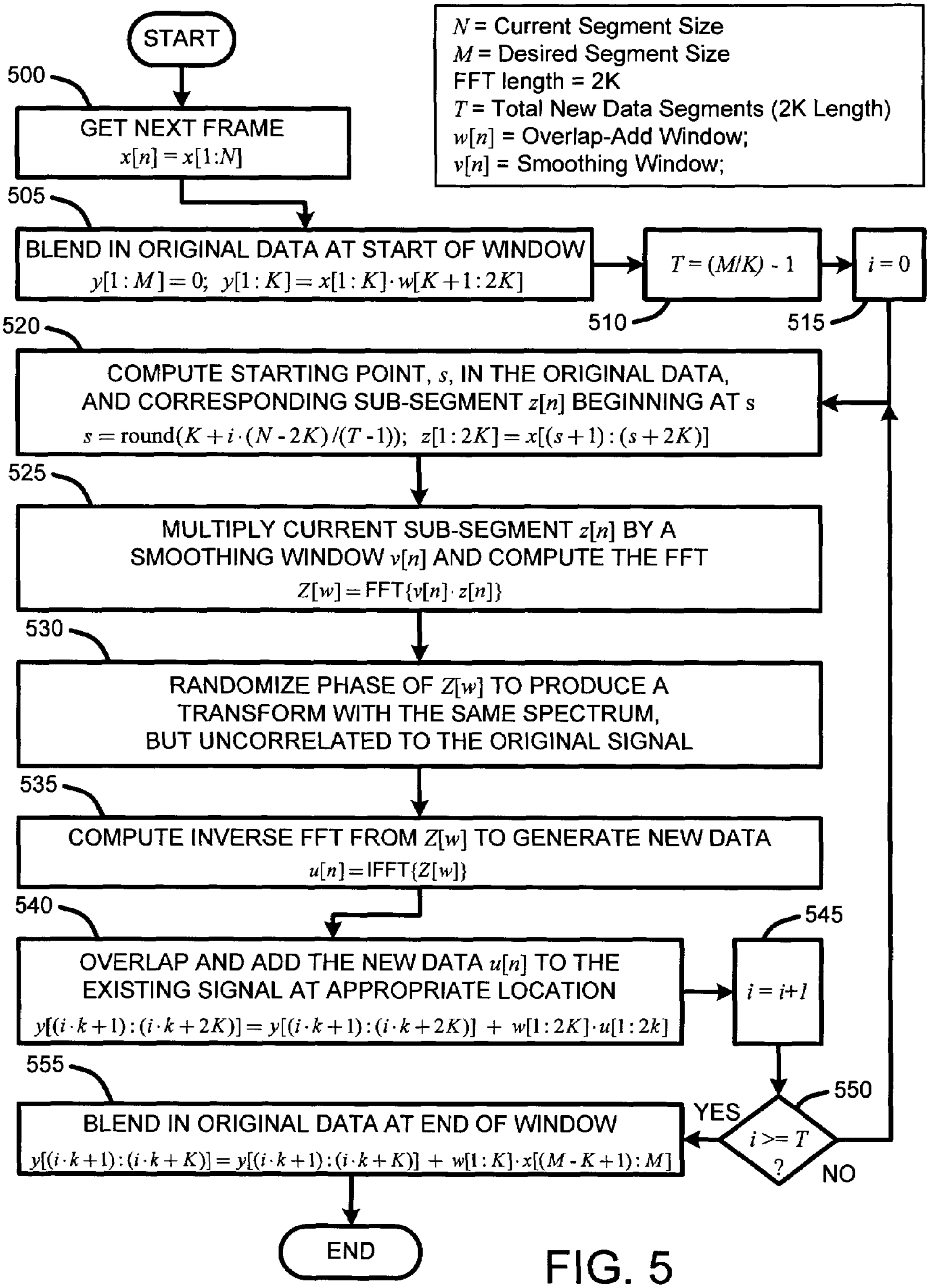
FIG. 5 illustrates an exemplary system flow diagram of an alternate embodiment for stretching unvoiced segments of an audio signal.

For example, in another embodiment, as illustrated by FIG. 5, rather than working directly with the entire current frame x[n], the process described with respect to FIG. 4 is modified to produce a smaller FFT, with more localized spectral information in order to avoid potentially stretching transients that can result in noticeable artifacts. In particular, in this embodiment, creating synthetic signal segments from a current signal frame again begins by getting a next current frame x[n] 500 from the incoming audio signal. However, instead of creating a single synthetic segment, a number of smaller synthetic segments are created and inserted via the aforementioned overlap/add process. Specifically, to ensure a smoother transition between the preceding frame and the partially synthesized frame that will be produced, this process starts by first windowing the current frame x[n] for blending original data into the start of what will become the partially synthesized frame y[n] 505. One method for accomplishing this windowing and blending is illustrated by Equation 3:

$$y[1:M]=0;\ y[1:K]=x[1:K]\cdot w[K+1:2K] \quad \text{Equation 3}$$

where M is the desired segment size, N is the current segment size, the FFT size is 2K, and w[n] is the blending window used. Note also that the first part of Equation 3 simply initializes y[n], for future use (e.g., in Equation 7).

Next, the total number, T, of overlapping segments, each of length 2K samples, that will be needed to obtain the desired final segment size, not counting the first and last half-segments is computed 510. In general, this computation 510 is accomplished as illustrated by Equation 4:

$$T=\left(\frac{\text{Desired Segment Size}\times 2}{FFT\ \text{Size}}\right)-1; \quad \text{Equation 4}$$

or simply, $$T=\left(\frac{M}{K}\right)-1$$

Next, an overlapping segment counter, i, is initialized to zero 515. Then, a starting point s in the original data, i.e., x[n], and a corresponding sub-segment, z[n], of x[n] which begins at point s is computed as illustrated by Equation 5A and 5B:

$$s=\text{round}(K+i\cdot(N-2K)/(T-1)) \quad \text{Equation 5A}$$

$$z[1:2K]=x[(s+1):(s+2K)] \quad \text{Equation 5B}$$

Next, z[n] is multiplied by a smoothing window, v[n], and the FFT of the smoothed sub-segment is computed 525 as illustrated by Equation 6:

$$Z[w]=FFT\{v[n]\cdot z[n]\} \quad \text{Equation 6}$$

At this point, the phase of the resulting FFT, Z[w], is then randomized 530, scaled to compensate for the smoothing window gain (e.g., 2 for a sine window), and the inverse FFT, u[n], is computed 535 from Z[w] to create a synthetic sub-segment having a similar spectrum, but no correlation with the original segment, z[n]. The newly synthesized signal sub-segment, u[n], is then inserted into the original signal at position s, and seamlessly added using the aforementioned conventional overlap/add process 540, such as, for example, a conventional sine window to create a partially stretched frame, as illustrated by Equation 7:

$$y[(i\cdot k+1):(i\times k+2K)]=y[(i\times k+1):(i\times k+2K)]+w[1:2K]\times u[1:2k] \quad \text{Equation 7}$$

At this point, the overlapping segment counter, i, is incremented 545, a determination is made as to whether the total number, T, of overlapping segments to obtain the desired final segment size have been inserted 550. If more overlapping segments need to be computed 550, then the steps described above, 520 through 550 are repeated until all overlapping segments have been computed and inserted into x[n] to create the partially synthesized stretched segment y[n]. Finally, once all overlapping segments have been computed and inserted to create y[n], to ensure a smoother transition between y[n] and the next frame, the process ends by windowing the partially synthesized frame y[n] with original data from x[n] into the end of the frame y[n] 555. One method for accomplishing this windowing and blending is illustrated by Equation 8:

$$y[(i\cdot k+1):(i\cdot k+K)]=y[(i\cdot k+1):(i\cdot k+K)]+w[1:K]\cdot x[(M-K+1):M] \quad \text{Equation 8}$$

Figure 6:
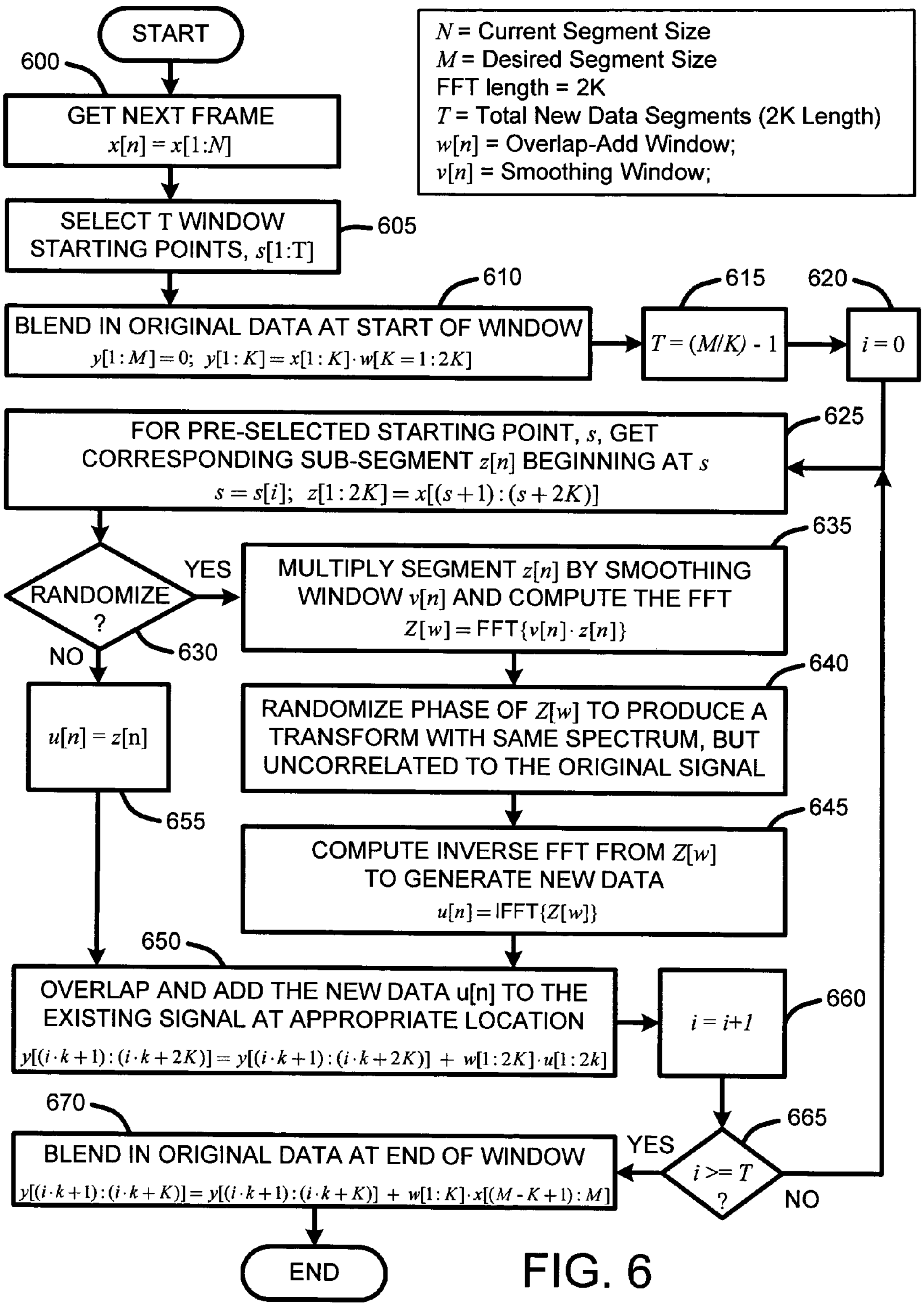
FIG. 6 illustrates an exemplary system flow diagram of an alternate embodiment for stretching unvoiced segments of an audio signal.

The embodiment described above computes sub-segments for insertion and windowing into the original signal frame or segment. However, the computed sub-segments are distributed evenly over the original signal frame without consideration as to the content or particular samples in the original signal frame. Consequently, in a related embodiment, as illustrated by FIG. 6, the process described above with respect to FIG. 5 is further improved by first selecting specific points within the frame or segment to be stretched rather than simply stretching uniformly throughout the original segment. Further, this embodiment also makes a determination as to whether randomization of the phase of the computed FFT is appropriate for each sub-segment, or whether each sub-segment can be used unmodified in the overlap/add operation for stretching the original signal segment or frame.

Consequently, in the embodiment illustrated by FIG. 6, the process again begins by getting a next current frame x[n] 600 from the incoming audio signal. However, unlike the embodiment described above, that current frame is then analyzed to select 605 the best T starting points, s[1:T] at which to stretch the current frame. Note that selection of the best T starting points is described in detail in Section 3.2.3 with respect to FIG. 7. Given these points at which the frame is to be stretched, the process of FIG. 6 proceeds in a similar fashion to the process described above with respect to FIG. 5, with some further differences that will be highlighted below.

In particular, following selection of the starting points, s[1:T] 605, to ensure a smoother transition between the preceding frame and the partially synthesized frame that will be produced, this process also starts by first windowing and blending the current frame x[n] for blending original data into the start of what will become the partially synthesized frame y[n] 610. One method for accomplishing this windowing and blending is illustrated by Equation 3, as described above. Next, the total number, T, of overlapping segments, each of length 2K samples, that will be needed to obtain the desired final segment size, and not counting the first and last half-segments, is computed 615. In general, this computation 615 is accomplished as illustrated by Equation 4, as described above.

Next, an overlapping segment counter, i, is initialized to zero 620. Then, given the pre-selected starting points, s[i], the sub-segment z[n] corresponding to the current starting point is retrieved from the current signal frame x[n] as illustrated by Equation 9:

$$s=s[i];\ z[1:2K]=x[(s+1):(s+2K)] \quad \text{Equation 9}$$

Then, a determination 630 is made as to whether the current sub-segment is to be synthesized. In other words, a determination 630 is made as to whether the FFT of the current sub-segment is to have its phase randomized as described above. This determination 630 is made as a function of the current and neighboring segment starting points, as described in further detail below and in Section 3.2.3 with respect to FIG. 7. More precisely, if the distance between the starting point of the current frame s[i], and that of the previous frame s[i−1] is K, then it is not necessary to randomize s[i+1]. This is because the new and old frames have the same spacing in the original and stretched frames, and therefore the signal can be preserved. Furthermore, if last unmodified frame was j, and s[i]−s[j]>2K it is not necessary to randomize the frame starting at s[i], because there will be no repetition of signal. A smaller threshold than 2K can also be used (e.g., K was used in one embodiment). If it is decided 630 to randomize the phase, then the current sub-segment z[n] is multiplied by a smoothing window, v[n], and the FFT of the smoothed sub-segment is computed 635 as illustrated by Equation 6, as described above.

At this point, similar to what was described above, the phase of the resulting FFT, Z[w], is then randomized 640, and the inverse FFT, u[n], is computed 645 from Z[w] to create a synthetic sub-segment having a similar spectrum, but no correlation with the original segment, z[n]. The newly synthesized signal sub-segment, u[n], is then inserted into the original signal at position s, and seamlessly added using the aforementioned conventional overlap/add process 650, such as, for example, a conventional sine window to create a partially stretched frame, as illustrated by Equation 7, as described above.

Alternately, in the case where it is determined 630 that the FFT of the current sub-segment is not to have its phase randomized as described above, then z[n] is simply passed as z[n] without modification for insertion into the original signal at position s using the aforementioned conventional overlap/add process 650, as described above. Further, it should be noted where particular segments are not modified, different blending windows at step 650 may be appropriate. In particular, if neither the current nor the previous sub-segment segment has been modified, then a different blending window (e.g., a Hamming window instead of a sine window) is used. The reason is that the unmodified sub-segments of the signal will actually be correlated in this case. Consequently, the window used should be such that wa[n]+wb[n]=1 instead of $(wa[n])^2+(wb[n])^2=1$, as described above. This choice of window is the one that will preserve the energy of the signal.

Further, it should be noted that blending of unmodified sub-segments with the original signal is the same as blending a signal with itself. Therefore, the resulting sub-segment will be identical to the corresponding portion of the original segment. Therefore, in one embodiment, rather than performing the blending operation, for segments that are not modified, the corresponding segment is simply copied from the original signal.

At this point, as with the example described with respect to FIG. 5, the overlapping segment counter, i, is incremented 660, and a determination is made as to whether the total number, T, of overlapping segments to obtain the desired final segment size have been inserted 665. If more overlapping segments need to be computed 665, then the steps described above, 625 through 650 are repeated until all overlapping segments have been computed and inserted into x[n] to create the partially synthesized stretched segment y[n]. Finally, once all overlapping segments have been computed and inserted to create y[n], to ensure a smoother transition between y[n] and the next frame, the process ends by windowing the partially synthesized frame y[n] with original data from x[n] into the end of the frame y[n] 670. One method for accomplishing this windowing and blending is illustrated by Equation 8, as described above.

3.2.3 Selection of Segments to Stretch:

Given the various segment types and stretching methods described above, there is still an issue of what point in the current frame is the best point to stretch that frame. For example, even within a relatively short frame, such as a 20 ms segment of the signal, there are often one or more transition points or even a few milliseconds of silence. In such cases, it is advantageous to select the specific point at which the frame is to be stretched. Therefore, in one embodiment, a stretching "quality" approach is used wherein a decision of where to stretch is made based on a combination of the energy of the segment (lower energy is better), and the normalized correlation coefficient found for that segment with its match (higher is better).

For example, in a typical case, a 20 ms frame may be divided into 4 sub-frames or segments of 5 ms each, or alternately, into potentially overlapping segments having approximately the estimated pitch period. If the computed energy of a particular sub-frame is sufficiently low, then a transition is said to exist within that frame. The lowest energy sub-frame is then selected for stretching. However, if the energy is not sufficiently low, then it is unlikely that a transition exists in the frame, and the normalized autocorrelation of the match of each sub-frame is used to select the best match to stretch.

Figure 7:
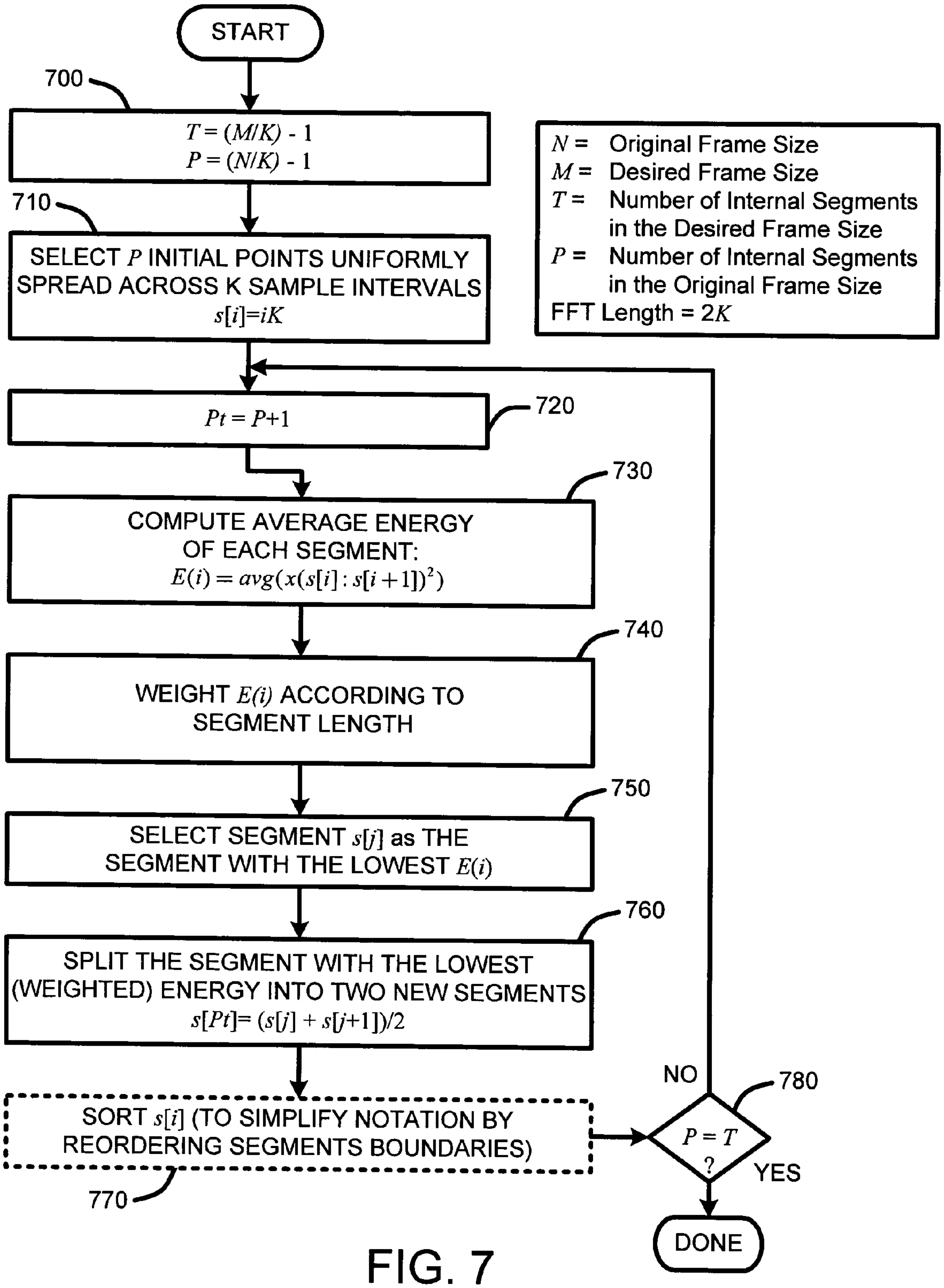
FIG. 7 illustrates an exemplary system flow diagram for selection of segment origin points for minimizing audible changes resulting from stretching of an audio signal.

For example, one embodiment for selection of segments to stretch is illustrated by FIG. 7. In general, in order to preserve more of the original signal, it is best to have as many starting points as possible be K (i.e., FFT/2) samples apart. Given this observation, FIG. 7 illustrates one exemplary procedure for determining the starting points. The first step is select initial starting points at points that are FFT/2 samples apart. As many new points as needed are then inserted between existing points, one at a time. The new points are inserted in the lowest energy segments. Further, in one embodiment, to account for segments of different lengths, the average energy of each segment is weighted to favor splitting longer segments. In one embodiment, the segments are weighted by the square root of the segment size. However, any conventional weighting may be used. In the final distribution, many points will still be FFT/2 apart. These segments (more likely the high energy segments), do not need to be modified.

In particular, as illustrated by FIG. 7, in selecting 710 the best points for stretching the current signal frame, the process begins by determining 700 a total number of internal segments T in a desired frame size, M, (T=(M/K)−1)), and a total number of internal segments P in the original frame size, I, (P=(M/K)−1)). At this time, a point counter Pt is set to P+1 720. Next, the average energy E(i) of each sub-segment is computed 730 as illustrated by Equation 10:

$$E(i)=avg(x(s[i]:s[i+1])^2) \qquad \text{Equation 10}$$

Next, in one embodiment, the average energy E(i) of each sub-segment is then weighted 740 in proportion to each sub-segments length. As noted above, in a tested embodiment, the segments were weighted by the square root of the segment size 740, as illustrated by Equation 11:

$$E(i) = \frac{E(i)}{\sqrt{(s[i+1]-s[i])}} \qquad \text{Equation 11}$$

However, as noted above, any conventional weighting method may be used to weight the energy values.

Once weighted 740, the average energy values E(i) are examined to select a segment s[j] having the lowest energy value 750. As noted above, these lowest energy segments are then split 750 into two, with a new starting point s[Pt] for stretching the current frame being located at the split point as illustrated by Equation 12:

$$s[Pt]=(s[j]+s[j+1])/2 \qquad \text{Equation 12}$$

In one embodiment, s[i] is then sorted 770 by energy value for purposes of simplifying notation. For example, assuming that there are four current points, say s[1:4]={64, 128, 192, 256}, and a new point is introduced between s[3] and s[4], at 224, the new point would be s[5]. Thus, the order now would be s[1:5]={64, 128, 192, 256, 224}. Sorting s[:] will restore the correct order of the points such that s[1:5]={64, 128, 192, 224, 256}.

Finally, a determination 780 is made as to whether the best T best points for stretching have been chosen. If not, then the steps described above, 720 through 780 are repeated until the best T best points for stretching have been chosen.

3.3 Stretching Mixed Segments:

As noted above, mixed segments represent a combination of both periodic and aperiodic components. Consequently, neither the method for stretching voice segments, or unvoiced segments, is individually appropriate for stretching mixed segments. For example, using the method for processing voiced segments will introduce noticeable artifacts into portions of the spectrum that are unvoiced. Similarly, using the method for processing unvoiced segments will destroy the periodicity in any voiced portions of the segment. Consequently, in one embodiment, both methods are used. Specifically, signals are generated from the current mixed segment using both the voiced and unvoiced methods. These signals are then combined to produce a composite signal that includes both the voiced and unvoiced signals.

Further, in a related embodiment, the voiced and unvoiced signals that are generated here are weighted as a function of the value of the normalized cross correlation peak. For example, as noted above, the value of the normalized cross correlation peak increases as the segment becomes more periodic, i.e., as there is more speech in the segment. Therefore, weighting the voiced signal more heavily in the case where the value of the normalized cross correlation peak is higher will improve the perceived quality of the speech in the stretched segment at the cost of some periodicity, and thus potentially some perceivable artifacts, in the unvoiced portion of the stretched segment. Conversely, as the value of the normalized cross correlation peak decreases, there is less periodicity in the segment. Therefore, the unvoiced signal is weighted more heavily, thereby improving the perceived quality of the unvoiced portions of the segment, at the cost of reducing the periodicity, and potentially the intelligibility, of any voiced portions of the segment.

For example, in a tested embodiment, a linear weighting from 0 to 1 corresponding to a normalized cross correlation peak of 0.45 to 0.95, respectively, was used to create a voiced component for the composite signal by generating a signal of the desired length using the voiced segment method described above. Similarly, a linear weighting from 1 to 0 corresponding to a normalized cross correlation peak of 0.45 to 0.95, respectively was used to create an unvoiced component for the composite signal by generating a signal of the same desired length using the unvoiced segment method described above. These two weighted signal components are then simply added to create the composite signal. However, it should be appreciated by those skilled in the art that there is no need to use a linear weighting as described, and that the weighting may be any linear or non-linear weighting desired. Further, the thresholds for voiced and unvoiced segments identified above were used in a tested embodiment, and are provided only for purposes of explanation. Clearly other threshold values for identifying voiced, unvoiced, and mixed segments may be used in accordance with the methods described herein.

3.4 Layered Approach for Compressing Segments:

In applications where there is sufficient freedom of choice, the selection of which segments to actually compress in any given frame or frames is also an important decision, as it typically affects the perceptual quality of the reconstructed signal for a human listener. For example, rather than compress all segments of a given signal equally, better results are typically achieved by employing a hierarchical or layered approach to compression. In particular, as noted above, the type of each segment is already known by the time that compression is to be applied to a frame. Given this information, the desired compression is achieved in any given frame or frames by first compressing particular segment types in a preferential hierarchical order.

In particular, frames or segments that represent voiced segments or silence segments (i.e., segments that include relatively low energy aperiodic signals) are compressed first. Next, unvoiced segments are compressed. Finally, mixed segments, or segments including transients are compressed. The reason for this preferential order is that compression of voiced or silence segments is easiest of the various segment types to accomplish without the creation of noticeable artifacts. Compression of unvoiced segments is the next easiest type to compress without noticeable artifacts. Finally, mixed segments and segments containing transients are compressed last, as such segments are the hardest to compress without noticeable artifacts.

Consequently, rather than compressing all segments of the signal equally, better results are typically achieved by selectively compressing particular frames. For example, compressing frames that represent speech, silence or simple noise, while avoiding compression of unvoiced segments or transients, produces a reconstructed signal having reduced perceivable artifacts. If sufficient compression cannot be accomplished by compressing voiced or silence segments, then non-transitional unvoiced segments are compressed in the manner described above. Finally, segments including transitions, i.e., mixed segments, are compressed if sufficient compression can not be achieved through compression of the voiced segments or non-transitional unvoiced segments. This hierarchical approach to compression serves to limit perceivable artifacts in the reconstructed signal.

Further, in off-line applications, or if sufficient unplayed frames are available, then the desired compression can be spread out over one or more frames of the complete available signal, as necessary, by compressing only those segments that will result in the least amount of signal distortion or artifacts. For example, one particular way of achieving such compression is by pre-assigning any desired compression ratios to each of the different frame types. For example, a compression ratio of 5× can be assigned to silence frames, 2× to voiced frames, 1.5× to unvoiced frames, and 1× (no compression) to mixed or transitional segments. Clearly, the compression ratios in this example are for purposes of explanation only, as any desired compression rations may be assigned to the various frame types.

In general, once the particular segments to be compressed have been selected or identified, compression of segments is handled in a manner similar to that described above for stretching of segments. For example, when compressing a voiced segment, a template is selected from within the segment, and a search for a match is performed. Once the match is identified, the segments are windowed, overlapped and added, thus cutting out the signal between the template and the match. As a result, the segment is shortened, or compressed. On the other hand, when compressing an unvoiced segment, either a random or predetermined shift is used to delete a portion of the segment or frame, along with a windowing function such as a constant square-sum window to compress the segment to the desired amount. Finally, mixed segments are compressed using a weighted combination of the voiced and unvoiced methods similar to that described above with respect to the stretching of mixed segments.

The foregoing description of the temporal audio scaler for providing automatic variable stretching and compression audio signal frames has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the temporal audio scaler described herein. It is intended that the scope of the invention be limited not by this detailed description, but rather by the claims appended hereto.

What is claimed is:

1. A system for temporal modification of segments of an audio signal, comprising:

extracting data frames from an audio signal;

examining content of each data frame and classifying a type of each data frame according to pre-established criteria;

temporally modifying at least part of at least one of the data frames using a temporal modification process that is specific to the classification type of each data frame; and determining whether an average compression ratio of temporally modified data frames corresponds to an overall target compression ratio, and wherein a next target compression ratio for at least one next current frame is automatically adjusted as needed for ensuring that the overall target compression ratio is approximately maintained.

2. The system of claim 1 wherein the classification of frame type is based solely on the frame being classified.

3. The system of claim 1 wherein the classification of frame type is at least partially based on information derived from one or more neighboring frames.

4. The system of claim 1 wherein the frames are processed sequentially.

5. The system of claim 1 wherein the classification is at least partially based on a periodicity of each data frame.

6. The system of claim 1 wherein the frame types include voiced frames and unvoiced frames.

7. The system of claim 6 wherein the frame types further include mixed frames, said mixed frames including both voiced and unvoiced segments.

8. A method for temporal modification of segments of an audio signal including speech, comprising:

sequentially extracting data frames from a received audio signal;

determining a content type of each segment of a current frame of the sequentially extracted data frames, said content types including voiced segments, unvoiced segments, and mixed segments;

temporally modifying at least one segment of the current frame by automatically selecting and applying a corresponding temporal modification process for the at least one segment of the current frame from among a voiced segment temporal modification process, an unvoiced temporal modification process, and a mixed segment temporal modification process; and determining whether an average compression ratio of temporally modified segments corresponds to an overall target compression ratio, and wherein a next target compression ratio for at least one next current frame is automatically adjusted as needed for ensuring that the overall target compression ratio is approximately maintained.

9. The method of claim 8 further comprising estimating an average pitch period for each frame, said frames each comprising at least one segment of approximately one pitch period in length.

10. The method of claim 8 wherein determining the content type of each segment of the current frame comprises computing a normalized cross correlation for each frame and comparing a maximum peak of each normalized cross correlation to predetermined thresholds for determining the content type of each segment.

11. The method of claim 8 wherein the content type of at least one segment is a voiced segment, and wherein temporally modifying the at least one segment comprises stretching the voiced segment to increase a length of the current frame.

12. The method of claim 11 wherein stretching the voiced segment comprises:

identifying at least one of the segments as a template;

searching for a matching segment whose cross correlation peak exceeds a predetermined threshold; and aligning and merging the matching segments of the frame.

13. The method of claim 12 wherein identifying at least one of the segments as a template comprises selecting a template from the end of the frame, and wherein searching for the matching segment comprises examining a recent past of the audio signal to identify a match.

14. The method of claim 12 wherein identifying at least one of the segments as a template comprises selecting a template from the beginning of the frame, and wherein searching for the matching segment comprises examining a near future of the audio signal to identify a match.

15. The method of claim 12 wherein identifying at least one of the segments as a template comprises selecting a template from between the beginning and end of the frame, and wherein searching for the matching segment comprises examining a near future and a near past of the audio signal to identify a match.

16. The method of claim 12 further comprising alternating selection points for the template such that consecutive templates are identified at different positions within the current frame.

17. The method of claim 8 wherein the content type of at least one segment is an unvoiced segment, and wherein temporally modifying the at least one segment comprises automatically generating and inserting at least one synthetic segment into the current frame to increase a length of the current frame.

18. The method of claim 17 wherein automatically generating the at least one synthetic segment comprises automatically computing the Fourier transform the current frame, introducing a random rotation of the phase into the FFT coefficients, and then computing the inverse FFT for each segment, thereby creating the at least one synthetic segment.

19. The method of claim 8 wherein the content type of at least one segment is a mixed segment, and wherein the mixed segment includes both voiced and unvoiced components.

20. The method of claim 19 wherein temporally modifying the mixed segment comprises:

identifying at least one of the segments as a template;

searching for a matching segment whose cross correlation peak exceeds a predetermined threshold;

aligning and merging the matching segments of the frame to create an interim voiced segment;

automatically generating and inserting at least one synthetic segment into the current frame to create an interim unvoiced segment;

weighting each of the interim voiced segment and the interim unvoiced segment relative to a normalized cross correlation peak computed for the current segment; and adding and windowing the interim voiced segment and the interim unvoiced segment to create a partially synthetic stretched segment.

21. The method of claim 8 wherein the content type of at least one segment is a voiced segment, and wherein temporally modifying the at least one segment comprises compressing the voiced segment to decrease a length of the current frame.

22. The method of claim 21 wherein compressing the voiced segment comprises:

identifying at least one of the segments as a template;

searching for a matching segment whose cross correlation peak exceeds a predetermined threshold;

cutting out the signal between the template and the match; and aligning and merging the matching segments of the frame.

23. The method of claim 8 wherein the content type of at least one segment is an unvoiced segment, and wherein temporally modifying the at least one segment comprises compressing the unvoiced segment to decrease a length of the current frame.

24. The method of claim 23 wherein compressing the voiced segment comprises:

shifting a segment of the frame from a first position in the frame to a second position in the frame;

deleting the portion of the frame between the first position and the second position; and adding the shifted segment of the frame to the signal representing the remainder of the frame by using a sine windowing function for blending the edges of the segment with the signal representing the remainder of the frame.

25. A computer-implemented process for providing dynamic temporal modification of segments of a digital audio signal, comprising using a computing device to:

receive one or more sequential frames of a digital audio signal;

decode each frame of the digital audio signal as it is received;

determine a content type of segments of the decoded audio signal from a group of predefined segment content types, each segment content type having an associated type-specific temporal modification process, wherein the group of predefined segment content types includes voiced type segments and unvoiced type segment;

modify a temporal scale of one or more segments of the decoded audio signal using the associated type-specific temporal modification process specific to each segment content type;

wherein modifying the temporal scale of one or more segments comprises any of temporally stretching and temporally compressing the one or more segments to approximately achieve a target temporal modification ratio and wherein the target temporal modification ratio of subsequent segments is automatically adjusted to achieve an average target temporal modification ratio relative to actual temporal scale modification of at least one preceding segment.

26. The computer-implemented process of claim 25 wherein the group of predefined segment content types further includes mixed type segments, said mixed type segments representing a mixture of voiced content and unvoiced content.

27. The computer-implemented process of claim 25 wherein determining the content type of segments comprises computing a normalized cross correlation for sub-segments of each segment, and comparing a maximum peak of each normalized cross correlation to predetermined thresholds for determining the content type of each segment.

28. The computer-implemented process of claim 25 wherein at least one segment is a voiced type segment, and wherein modifying the temporal scale of voiced type segments comprises stretching at least one voiced type segment by approximately one or more pitch periods to increase a length of the at least one voiced type segment.

29. The computer-implemented process of claim 25 wherein stretching the at least one voiced type segment comprises:

identifying at least one sub-segment of approximately one pitch period in length as a template;

searching for a matching sub-segment whose cross correlation peak exceeds a predetermined threshold; and aligning and merging the matching segments of the frame.

30. The computer-implemented process of claim 25 wherein at least one segment is an unvoiced type segment, and wherein modifying the temporal scale of unvoiced type segments comprises:

automatically generating at least one synthetic segment from one or more sub-segments of the at least one unvoiced-type segment; and inserting the at least one synthetic segment into the at least one unvoiced type segment to increase a length of the at least one unvoiced type segment.

31. The computer-implemented process of claim 30 wherein automatically generating the at least one synthetic segment comprises:

automatically computing the Fourier transform of at least one sub-segment of the at least one unvoiced type segment;

randomizing the phase of at least some of the computed FFT coefficients; and computing the inverse FFT for the computed FFT coefficients to generate the at least one synthetic segment.

32. The computer-implemented process of claim 30 further comprising automatically determining one or more insertion points for inserting the at least one synthetic segment into the at least one unvoiced type segment.

* * * * *